(12) United States Patent
Jang

(10) Patent No.: US 10,394,394 B2
(45) Date of Patent: Aug. 27, 2019

(54) TOUCH SCREEN PANEL-INTEGRATED DISPLAY DEVICE AND METHOD FOR FABRICATING THE SAME

(71) Applicant: LG DISPLAY CO., LTD., Seoul (KR)

(72) Inventor: Jooyoung Jang, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 158 days.

(21) Appl. No.: 15/353,237

(22) Filed: Nov. 16, 2016

(65) Prior Publication Data

US 2017/0160836 A1 Jun. 8, 2017

(30) Foreign Application Priority Data

Dec. 7, 2015 (KR) .................. 10-2015-0173545

(51) Int. Cl.
*G06F 3/041* (2006.01)
*G06F 3/044* (2006.01)
(Continued)

(52) U.S. Cl.
CPC .......... *G06F 3/044* (2013.01); *G02F 1/13338* (2013.01); *G06F 3/0412* (2013.01); *G02F 2001/133388* (2013.01); *G02F 2001/136236* (2013.01); *G06F 2203/04103* (2013.01); *G06F 2203/04107* (2013.01); *G09G 2300/0413* (2013.01); *G09G 2300/0426* (2013.01)

(58) Field of Classification Search
None
See application file for complete search history.

(56) References Cited

U.S. PATENT DOCUMENTS

2009/0206339 A1 8/2009 Park et al.
2012/0092607 A1 4/2012 Hui
(Continued)

FOREIGN PATENT DOCUMENTS

CN 103365007 A 10/2013
CN 103853409 A 6/2014
(Continued)

OTHER PUBLICATIONS

Taiwanese First Office Action, dated Aug. 16, 2017, for Taiwanese Application No. 105127729, 17 pages. (with English Translation).
(Continued)

*Primary Examiner* — Amare Mengistu
*Assistant Examiner* — Sarvesh J Nadkarni
(74) *Attorney, Agent, or Firm* — Seed IP Law Group LLP

(57) ABSTRACT

There are provided a display device and a method for fabricating the display device. The display device includes a thin-film transistor located in each pixel defined by intersection between a gate line extending in a first direction and a data line extending in a second direction on a substrate. A first electrode has a first layer connected to one of a source electrode or a drain electrode of the transistor through the first contact hole and a second layer located on the first layer and in the first contact hole. There is also a signal line including a first signal line layer formed on the first protective layer of the same material on the same layer as the first layer of the first electrode and a second signal line layer formed on the first signal line layer of the same material as the second.

19 Claims, 22 Drawing Sheets

(51) Int. Cl.
*G02F 1/1333* (2006.01)
*G02F 1/1362* (2006.01)

(56) References Cited

U.S. PATENT DOCUMENTS

| | | |
|---|---|---|
| 2013/0033439 A1 | 2/2013 | Kim et al. |
| 2013/0249820 A1 | 9/2013 | Woo et al. |
| 2014/0132534 A1 | 5/2014 | Kim |
| 2014/0329374 A1 | 11/2014 | Rodder et al. |
| 2015/0049290 A1 | 2/2015 | Uchida et al. |
| 2016/0071884 A1* | 3/2016 | Miyamoto .......... H01L 27/1251 257/59 |
| 2016/0266693 A1* | 9/2016 | Chen .................. G06F 3/0412 |
| 2016/0320647 A1* | 11/2016 | Shin .................... H01L 27/124 |
| 2016/0364049 A1* | 12/2016 | Kida .................... G06F 3/0418 |

FOREIGN PATENT DOCUMENTS

| | | |
|---|---|---|
| CN | 104199586 A | 12/2014 |
| CN | 204203592 U | 3/2015 |
| CN | 104965622 A | 10/2015 |
| JP | 1 882 979 A2 | 1/2008 |
| JP | 2015-106412 A | 6/2015 |
| TW | 201535706 A | 9/2015 |
| WO | 2013/150876 A1 | 10/2013 |

OTHER PUBLICATIONS

Extended European Search Report, dated Apr. 10, 2017, for European Application No. 16200798.3—1507, 6 pages.

\* cited by examiner

TOUCH SCREEN PANEL-INTEGRATED DISPLAY DEVICE AND METHOD FOR FABRICATING THE SAME

CROSS-REFERENCE TO RELATED APPLICATIONS

This application claims priority from Korean Patent Application No. 10-2015-0173545, filed on Dec. 7, 2015, which is hereby incorporated by reference for all purposes as if fully set forth herein.

BACKGROUND OF THE INVENTION

Field of the Invention

The present invention relates to a touch screen panel-integrated display device and a method for fabricating the same.

Description of the Related Art

With progress of the information-oriented society, various types of demands for display devices for displaying an image are increasing. Recently, various types of display devices such as a liquid crystal display (LCD) device, a plasma display panel (PDP) device, or an organic light emitting diode (OLED) display device have been used.

Such display devices are breaking away from conventional input systems, such as a button, a keyboard and a mouse, and providing a touch-based input system which allows a user to intuitively and conveniently input information or instructions.

In order to provide the touch-based input system, it is required to identify a touch or non-touch of a user and exactly detect touch coordinates.

To this end, according to the related art, one of various touch modes such as a resistance film mode, a capacitance mode, an electromagnetic induction mode, an infrared mode, and an ultrasonic mode is adopted to provide touch sensing.

Further, regarding application of a touch screen to a display device, a technology of installing a touch sensor within a display device has been developed. In particular, an in-cell type display device using a common electrode formed on a lower substrate as a touch sensing electrode has been developed.

However, such an in-cell type display device needs a touch sensing electrode to be formed therein through a detailed process, and, thus, requires high manufacturing cost and a long manufacturing time, which causes the decrease in product competitiveness.

SUMMARY OF THE INVENTION

An aspect of the present invention provides a touch screen panel-integrated display device and a method for manufacturing the same and also provides a structure and method of reducing detailed processes.

According to an aspect of the present invention, there is provided a display device including: a thin-film transistor located in each pixel defined by intersection between a gate line extending in a first direction and a data line extending in a second direction on a substrate; a first protective layer which is located on the thin-film transistor and in which a first contact hole is formed; a first electrode including a first layer connected to one of a source electrode or a drain electrode of the thin-film transistor through the first contact hole and a second layer located on the first layer and in the first contact hole; signal line including a first signal line layer formed on the first protective layer of the same material on the same layer as the first layer of the first electrode and a second signal line layer formed on the first signal line layer of the same material on the same layer as the second layer of the first electrode; and a second electrode located on a different layer from the first electrode.

According to another aspect of the present invention, there is provided a method for fabricating a display device, including: forming a thin-film transistor on a substrate; forming a first protective layer located on the thin-film transistor and including a first contact hole; forming a first electrode material and a signal line material on the first protective layer; forming a first electrode including a first layer connected to one of a source electrode or a drain electrode of the thin-film transistor through the first contact hole and a second layer located on the first layer and in the first contact hole using a photomask, and a signal line including a first signal line layer formed on the first protective layer of the same material on the same layer as the first layer of the first electrode and a second signal line layer formed on the first signal line layer of the same material on the same layer as the second layer of the first electrode; forming a second protective layer including a second contact hole on the first electrode and the signal line; and forming a second electrode connected to the signal line through the second contact hole on the second protective layer.

As described above, according to the present invention, it is possible to provide a fabricating method for reducing detailed processes of a touch screen panel-integrated display device and a display device to which the fabricating method is applied.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE VARIOUS EMBODIMENTS

Figure 1:
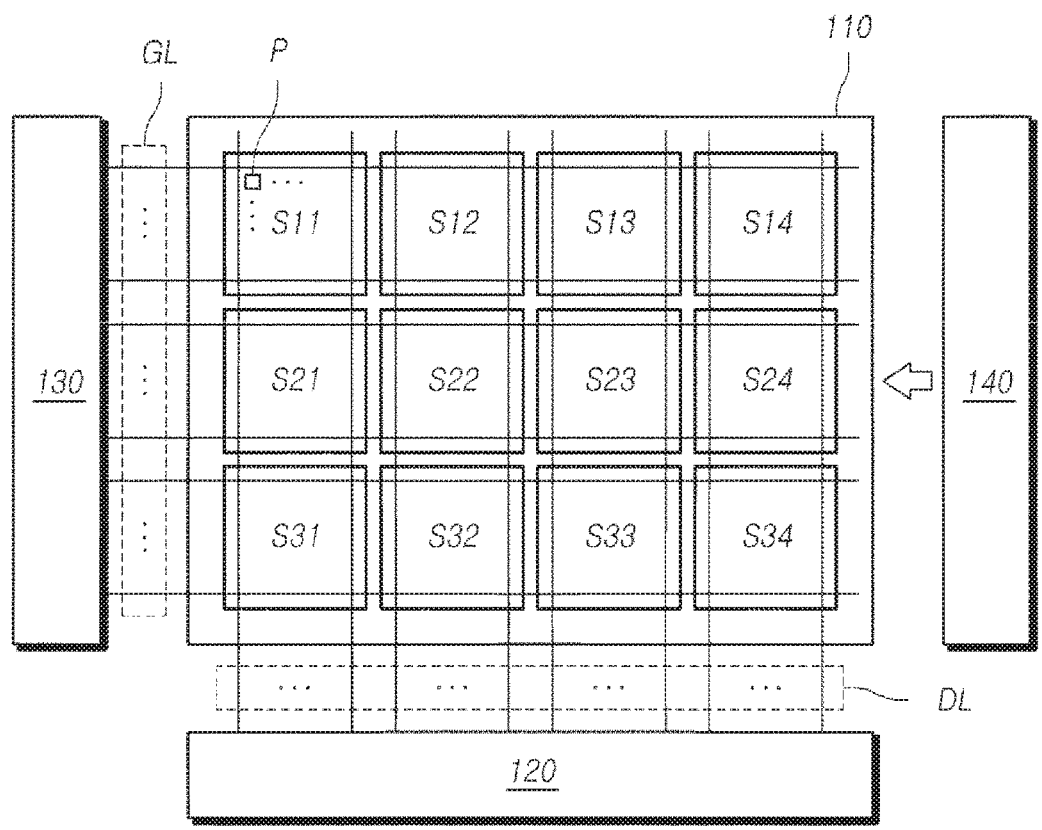
FIG. 1 is a schematic diagram illustrating a touch screen panel-integrated display device according to an exemplary embodiment.

Hereinafter, some embodiments of the present invention will be described in detail with reference to the accompanying drawings. When reference numerals refer to components of each drawing, although the same components are illustrated indifferent drawings, the same components are referred to by the same reference numerals as possible. Further, if it is considered that description of related known configuration or function may cloud the gist of the present disclosure, the description thereof will be omitted.

Further, in describing components of the present disclosure, terms such as first, second, A, B, (a), and (b) can be used. These terms are used only to differentiate the components from other components. Therefore, the nature, order, sequence, or number of the corresponding components is not limited by these terms. It is to be understood that when one element is referred to as being "connected to" or "coupled to" another element, it may be directly connected to or directly coupled to another element, connected to or coupled to another element, having still another element "intervening" therebetween, or "connected to" or "coupled to" another element via still another element.

The present invention provides a fabricating method using a metal material required to form a signal line in order to make connection (contact) between a pixel electrode and a source electrode or a drain electrode, and also provides a display device including a connection pattern structure that enables a pixel electrode to be connected to a source electrode or a drain electrode.

FIG. 1 is a schematic diagram illustrating a touch screen panel-integrated display device according to an exemplary embodiment.

Referring to FIG. 1, a touch screen panel-integrated display device 100 according to an exemplary embodiment includes a panel 110, a data driver unit 120, a gate driver unit 130, and an integrated circuit 140 that controls a touch signal (hereinafter, referred to as "touch IC").

On the panel 110, a plurality of gate lines GL is disposed in a first direction (for example, horizontal direction or vertical direction), a plurality of data lines DL is disposed in a second direction (for example, vertical direction or horizontal direction), and a plurality of pixels P is defined respectively corresponding to intersections between the plurality of data lines DL and the plurality of gate lines GL.

In a pixel area of each pixel P, a source electrode or a drain electrode is connected to a data line DL and a gate electrode is connected to a gate line GL. Further, any one of the drain electrode or the source electrode is connected to a pixel electrode (or first electrode).

Further, a plurality of electrodes S11 to S14, S21 to S24 and S31 to S34 grouped into a plurality of electrode groups is also formed and spaced apart from each other on the panel 110.

The panel 110 concurrently functions as a "display panel" and a "touch screen panel (TSP)".

That is, the panel 110 may be referred to as a panel in which a display panel and a touch screen panel are integrated together or a display panel in which an in-cell touch screen panel (TSP) is embedded.

When the panel 110 functions as a display panel, a driving mode of the panel 110 is referred to as "display driving mode". When the panel 110 functions as a touch screen panel, a driving mode of the panel 110 is referred to as "touch driving mode".

When the driving mode of the panel 110 is the display driving mode, the data driver unit 120 supplies a data voltage Vdata or data signal for display to the plurality of data lines DL.

When the driving mode of the panel 110 is the display driving mode, the gate driver unit 130 sequentially supplies a gate signal or scan signal for display to the plurality of gate lines GL.

When the driving mode of the panel 110 is the touch driving mode, the touch IC 140 applies a touch driving signal to all or parts of the plurality of electrodes S11 to S14, S21 to S24 and S31 to S34 which is directly connected thereto via signal lines. Herein, the touch driving signal is also referred to as a touch sensing signal, a touch sensing voltage, or a touch driving voltage Vtd.

For example, when the driving mode of the panel 110 is the touch driving mode, the touch IC 140 applies the touch driving signal to all or parts of the plurality of electrode groups into which the plurality of electrodes S11 to S14, S21 to S24 and S31 to S34 is grouped.

Meanwhile, the touch screen panel-integrated display device 100 according to an exemplary embodiment may further include a timing controller (not illustrated) which controls the driving timing of the data driver unit 120 and the gate driver unit 130.

Further, the touch screen panel-integrated display device 100 according to an exemplary embodiment may further include a touch controller (not illustrated) which detects a touch, the coordinates of the touch, and the like by receiving sensing data (for example, capacitance, a change in capacitance, a voltage, or the like) measured by the touch IC 140 through the plurality of electrodes S11 to S14, S21 to S24 and S31 to S34 which functions as touch electrodes.

Meanwhile, the panel 110 of the touch screen panel-integrated display device 100 according to an exemplary embodiment operates alternately in the display driving mode and the touch driving mode. The timing of the display driving mode and the timing of the touch driving mode can be controlled in response to a control signal output from the timing controller, the touch controller, or the like, or in some cases, can be controlled through cooperation between the timing controller and the touch controller.

Meanwhile, the touch screen panel-integrated display device 100 according to an exemplary embodiment employs a capacitive touch sensing method capable of detecting a touch, the coordinates of the touch, and the like on the basis of a change in capacitance using a plurality of touch electrodes (for example, horizontal electrodes and vertical electrodes) formed on the touch screen panel.

This capacitive touch sensing method can be classified into, for example, a mutual capacitance touch sensing method, a self-capacitance touch sensing method, and the like.

According to the mutual capacitance touch sensing method that is one example of the capacitance touch sensing method, electrodes disposed in one direction from among horizontal electrodes and vertical electrodes function as Tx electrodes (also referred to as driving electrodes) to which a driving voltage is applied, and electrodes disposed in the other direction from among horizontal electrodes and vertical electrodes function as Rx electrodes (also referred to as sensing electrodes) which sense the driving voltage and generate capacitance together with the Tx electrodes. A touch, the coordinates of the touch, and the like, are detected on the basis of a change in capacitance (mutual capacitance) between the Tx and Rx electrodes depending on whether or not a pointer such as a finger or pen is present.

According to the self-capacitance touch sensing method that is another example of the capacitance touch sensing method, each touch electrode generates capacitance (self-capacitance) with a pointer such as a finger or pen, measures values of capacitance between the respective touch electrodes and the pointer such as a finger or pen depending on whether or not the pointer is present, and detects a touch, the coordinates of the touch, and the like, on the basis of the values of capacitance. Unlike the mutual capacitance touch sensing method, the self-capacitance touch sensing method concurrently applies and senses a driving voltage (touch driving signal) through each touch electrode. Therefore, according to the self-capacitance touch sensing method, there is no distinction between Tx electrodes and Rx electrodes.

The touch screen panel-integrated display device 100 according to an exemplary embodiment may employ one of the above-mentioned two capacitance touch sensing methods (the mutual capacitance touch sensing method and the self-capacitance touch sensing method). However, in the present specification, for convenience in explanation, the embodiment will be described on the assumption that the self-capacitance touch sensing method is employed.

The above-mentioned data driver unit 120 may include at least one data driver integrated circuit (IC) (also referred to as "source driver IC"). The at least one data driver IC may be connected to bonding pads of the panel 110 by tape automated bonding (TAB) or chip-on-glass (COG) bonding, directly provided on the panel 110, or in some cases, integrated and provided on the panel 110.

The above-mentioned gate driver unit 130 may be located at only one side of the panel 110 as illustrated in FIG. 1 or may be divided into two sections and then located at both sides of the panel 110 depending on the driving method.

Further, the gate driver unit 130 may include at least one gate driver IC. The at least one gate driver IC may be connected to bonding pads of the panel 110 by TAB or COG bonding, implemented as a gate-in-panel IC which is directly provided on the panel 110, or in some cases, integrated and provided on the panel 110.

As illustrated in FIG. 1, the above-mentioned touch IC 140 may be formed outside the data driver unit 120 and the gate driver unit 130 as a component separate from the data driver unit 120 and the gate driver unit 130. Otherwise, the touch IC 140 may be implemented as an internal component of another separate driver IC (for example, a display driver IC) which may include at least one of the data driver unit 120 and the gate driver unit 130, or as an internal component of the data driver unit 120 or the gate driver unit 130.

Therefore, in the touch driving mode, the application of a touch driving signal from the touch IC 140 to all or parts of the plurality of electrodes which functions as the touch electrodes in the touch driving mode can be considered as the application of the touch driving signal from the separate driver IC including the touch IC 140 to all or parts of the plurality of electrodes which functions as the touch electrodes. Depending on the design, it can be considered as the application of the touch driving signal from the data driver unit 120 or the gate driver unit 130 including the touch IC 140 to all or parts of the plurality of electrodes which functions as the touch electrodes.

The touch IC 140 is not limited to the above-mentioned implementation or design, but it should be understood that any configuration or an internal or external component thereof, the functions of which are equivalent or similar to those described herein, belongs to this disclosure.

Further, although the touch IC 140 is illustrated as being one circuit in FIG. 1, the touch IC 140 may be implemented as two or more circuits.

Meanwhile, the touch IC 140 needs a separate signal line configuration connected to each of the plurality of electrodes S11 to S14, S21 to S24 and S31 to S34 in order to apply the touch driving signal to all or parts of the plurality of electrodes S11 to S14, S21 to S24 and S31 to S34.

At least one signal line may be formed on the panel 110 in a first direction (for example, horizontal direction) or a second direction (for example, vertical direction). The at least one signal line is connected to each of the plurality of electrodes S11 to S14, S21 to S24 and S31 to S34 to transfer the touch driving signal or a common voltage thereto.

When the signal line configuration connected to each of the plurality of electrodes S11 to S14, S21 to S24 and S31 to S34 is implemented as two or more signal lines, resistance can be reduced.

Meanwhile, the direction of at least one signal line connected to each of the plurality of electrodes S11 to S14, S21 to S24 and S31 to S34 may vary depending on whether sensing is performed by grouping the plurality of electrodes S11 to S14, S21 to S24 and S31 to S34 in the second direction (for example, vertical direction) in which the data lines are formed or in the first direction (for example, horizontal direction) in which the gate lines are formed.

Figure 3:
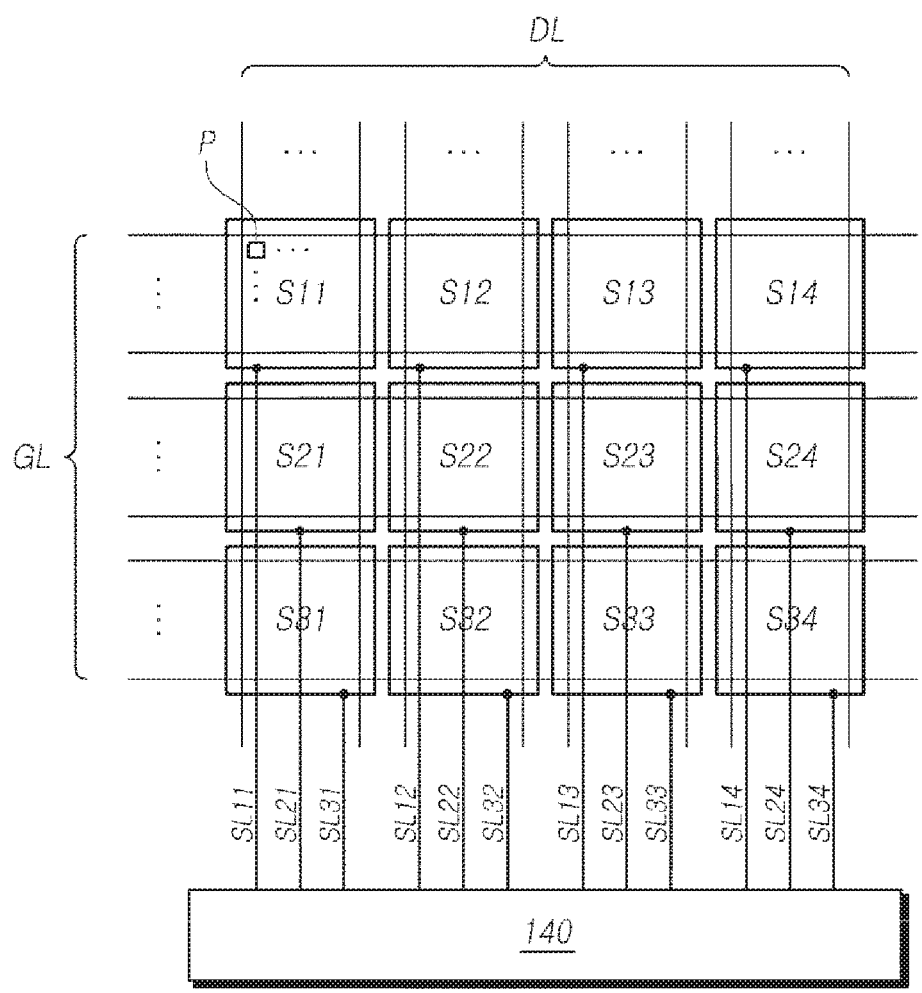
FIG. 3 is a plane view illustrating a panel included in a touch screen panel-integrated display device according to an exemplary embodiment.

If sensing is performed by grouping the plurality of electrodes S11 to S14, S21 to S24 and S31 to S34 in the second direction (for example, vertical direction) in which the data lines are formed, a least one signal line connected to each of the plurality of electrodes S11 to S14, S21 to S24 and S31 to S34 may be disposed in the second direction (for example, vertical direction) in which the data lines are formed (refer to FIG. 3).

If sensing is performed by grouping the plurality of electrodes S11 to S14, S21 to S24 and S31 to S34 in the first direction (for example, horizontal direction) in which the gate lines are formed, at least one signal line connected to each of the plurality of electrodes S11 to S14, S21 to S24 and S31 to S34 may be disposed in first direction (for example, horizontal direction) in which the gate lines are formed. However, in the present specification, for convenience in explanation, the embodiment will be described on the assumption that at least one signal line connected to each of the plurality of electrodes S11 to S14, S21 to S24 and S31 to S34 is disposed in the second direction (for example, vertical direction) in which the data lines are formed.

The plurality of electrodes S11 to S14, S21 to S24 and S31 to S34 mentioned herein functions as the "touch electrodes" to all or parts of which the touch driving signal is applied when the driving mode is the touch driving mode and as the "common electrodes" to which a common voltage Vcom is applied and which are disposed to face pixel electrodes formed on the panel when the driving mode is the display driving mode, as described above. An electrode functioning as a touch electrode or a common electrode depending on a driving mode is referred to as a second electrode.

In this aspect, the touch screen panel-integrated display device 100 according to an exemplary embodiment may be, for example, an in-plane switching (IPS) mode liquid crystal display device in which liquid crystal molecules are aligned horizontally and rotated in place to display an image and which has advantages of high resolution, low power consumption, wide viewing angle, and the like. More specifically, the touch screen panel-integrated display device 100 may be an advanced high performance-IPS (AH-IPS) mode liquid crystal display device.

Herein, the pixel electrodes and the common electrodes S11 to S14, S21 to S24 and S31 to S34 may be formed on the same substrate such that a horizontal electric field is generated between the pixel electrodes and the common electrodes S11 to S14, S21 to S24 and S31 to S34 in the display driving mode.

As another example, the touch screen panel-integrated display device 100 according to an exemplary embodiment may be an organic light emitting display device in which an organic emission layer is formed between a pixel electrode and a common electrode. In this case, the pixel electrode and the common electrode may be formed on the same substrate.

Figure 2:
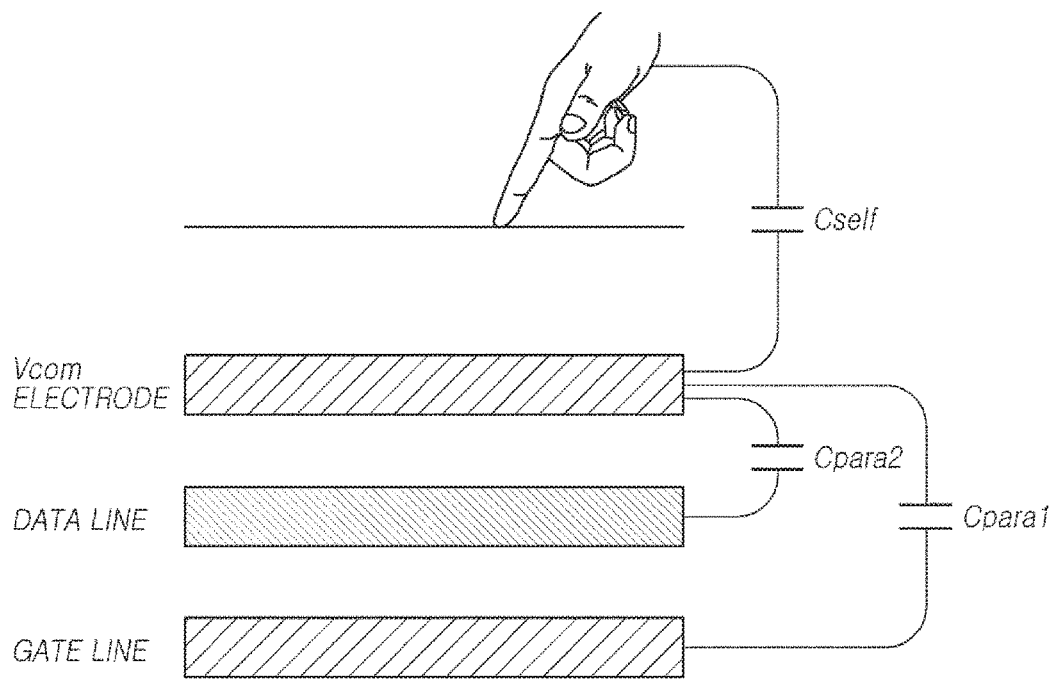
FIG. 2 is a diagram illustrating capacitance components (Cself, Cpara1 and Cpara2) generated during a touch driving mode in a touch screen panel-integrated display device according to an exemplary embodiment.

FIG. 2 is a diagram illustrating capacitance components (Cself, Cpara1 and Cpara2) generated during a touch driving mode in a touch screen panel-integrated display device according to an exemplary embodiment.

Referring to FIG. 2, the plurality of electrodes S11 to S14, S21 to S24 and S31 to S34, which functions as the touch electrodes in the touch driving mode and the common electrodes which form liquid crystal capacitors together with the pixel electrodes in the display driving mode, generate self-capacitance Cself together with a pointer such as a finger or pen in order to detect a touch, the coordinates of the touch, and the like in the touch driving mode. Meanwhile, the plurality of electrodes functioning as the common electrodes may also generate parasitic capacitance Cpara1 and Cpara2 together with a gate line and a data line. However, the parasitic capacitances Cpara1 and Cpara2 are negligible since they are much smaller than the self-capacitance.

In the following, the panel 110 included in the touch screen panel-integrated display device 100 according to an exemplary embodiment, the method of applying the common voltage and the touch driving signal to the plurality of electrodes S11 to S14, S21 to S24 and S31 to S34 which functions as both the common electrodes and the touch electrodes, the method of applying the data voltage and the touch driving signal (or the signal corresponding thereto) to the data lines DL, the method of applying the data voltage and the touch driving signal (or the signal corresponding thereto) to the gate lines GL, and the like will be described in more detail.

First, the panel 110 included in the touch screen panel-integrated display device 100 according to an exemplary embodiment will be described in more detail with reference to FIG. 3.

FIG. 3 is a plane view illustrating a panel included in a touch screen panel-integrated display device according to an exemplary embodiment.

Referring to FIG. 3, as described above, the panel 110 includes the plurality of data lines DL, the plurality of gate lines GL, and the plurality of electrodes S11 to S14, S21 to S24 and S31 to S34.

Further, the panel 110 may operate in the display driving mode or the touch driving mode, as described above.

In this regard, the plurality of data lines DL and the plurality of gate lines GL formed on the panel 110 is configured to enable the panel 110 to function as the display panel.

Further, the plurality of electrodes S11 to S14, S21 to S24 and S31 to S34 formed on the panel 110 is configured to enable the panel 110 to function as both the display panel and the touch screen panel.

More specifically, when the panel 110 functions as the display panel, i.e., when a driving mode of the panel 110 is the display driving mode, the plurality of electrodes S11 to S14, S21 to S24 and S31 to S34 functions as the "common electrodes" (also referred to as the "Vcom electrodes") to which the common voltage Vcom is applied and which are disposed to face a pixel electrode (first electrode, not illustrated).

Further, when the panel 110 functions as the touch screen panel, i.e., when a driving mode of the panel 110 is the touch driving mode, the plurality of electrodes S11 to S14, S21 to S24 and S31 to S34 forms capacitors together with the touch pointer (for example, a finger or a pen) in response to the touch driving voltage applied thereto, and functions as the "touch electrodes" which measure the capacitance of the capacitors which are formed in this manner.

In other words, the plurality of electrodes S11 to S14, S21 to S24 and S31 to S34 functions as the common electrodes (Vcom electrodes) in the display driving mode and the touch electrodes in the touch driving mode.

The plurality of electrodes S11 to S14, S21 to S24 and S31 to S34 is applied with the common voltage Vcom in the display driving mode and the touch driving signal in the touch driving mode.

Thus, as illustrated in FIG. 3, signal lines SL11 to SL14, SL21 to SL24 and SL31 to SL34 may be connected to the plurality of electrodes S11 to S14, S21 to S24 and S31 to S34 in order to transfer the common voltage or the touch driving signal to the plurality of electrodes S11 to S14, S21 to S24 and S31 to S34.

Accordingly, in the touch driving mode, the touch driving signal Vtd generated from the touch IC 140 is applied to all or parts of the plurality of electrodes S11 to S14, S21 to S24 and S31 to S34 through the signal lines SL11 to SL14, SL21 to SL24 and SL31 to SL34. In the display driving mode, the common voltage Vcom supplied from a common voltage supply unit (not illustrated) is applied to the plurality of electrodes S11 to S14, S21 to S24 and S31 to S34 through the signal lines SL11 to SL14, SL21 to SL24 and SL31 to SL34.

Referring to FIG. 3, pixels P are defined respectively corresponding to intersections between the plurality of data lines DL and the plurality of gate lines GL formed on the panel 110.

Herein, each pixel may be one of red (R), green (G) and blue (B) pixels. It should be noted that a complete, full color pixel will include one pixel each of the red, green and blue. Thus, the term pixel, as used herein is sufficiently broad to include the single color pixel, whether red, green, white, blue or other color and to also include a combination of these colors which are operated together to make a complete, full color pixel.

Referring to FIG. 3, two or more pixels P may be defined in an area (hereinafter, also referred to as "unit touch electrode area") where each of the plurality of electrodes S11 to S14, S21 to S24 and S31 to S34 functioning as the common electrodes and the touch electrodes is formed. That is, one of the plurality of electrodes S11 to S14, S21 to S24 and S31 to S34 corresponds to two or more pixels P.

For example, a 24*3 number of data lines DL and 24 gate lines GL may be disposed in one area (unit touch electrode area) where each of the plurality of electrodes S11 to S14, S21 to S24 and S31 to S34 functioning as the common electrodes and the touch electrodes is formed, thereby defining a 24*3*24 number of pixels P.

Meanwhile, each of the plurality of electrodes S11 to S14, S21 to S24 and S31 to S34 functioning as the common electrodes and the touch electrodes may be a block-shaped pattern, as illustrated in FIG. 3, or in some cases, maybe a pattern including a comb teeth pattern.

The present invention can be applied to a case where each of the plurality of touch electrodes S11 to S14, S21 to S24 and S31 to S34 functioning as the common electrodes and the touch electrodes is the pattern including a comb teeth pattern.

Although the plurality of electrodes functioning as the touch electrodes and the common electrodes mentioned herein is illustrated in the several figures as being 12 electrodes which are disposed in the shape of a matrix containing 3 rows and 4 columns, this is only illustrative for convenience in explanation. The plurality of electrodes functioning as both the touch electrodes and the common electrodes may be arranged into a various shapes of matrix and in various numbers in consideration of, for example, the size of the touch screen panel-integrated display device 100 and the panel 110 and the design criteria of the touch system.

The exemplary embodiment of present invention can be applied to a liquid crystal display device or an organic light emitting diode display device.

Figure 4:
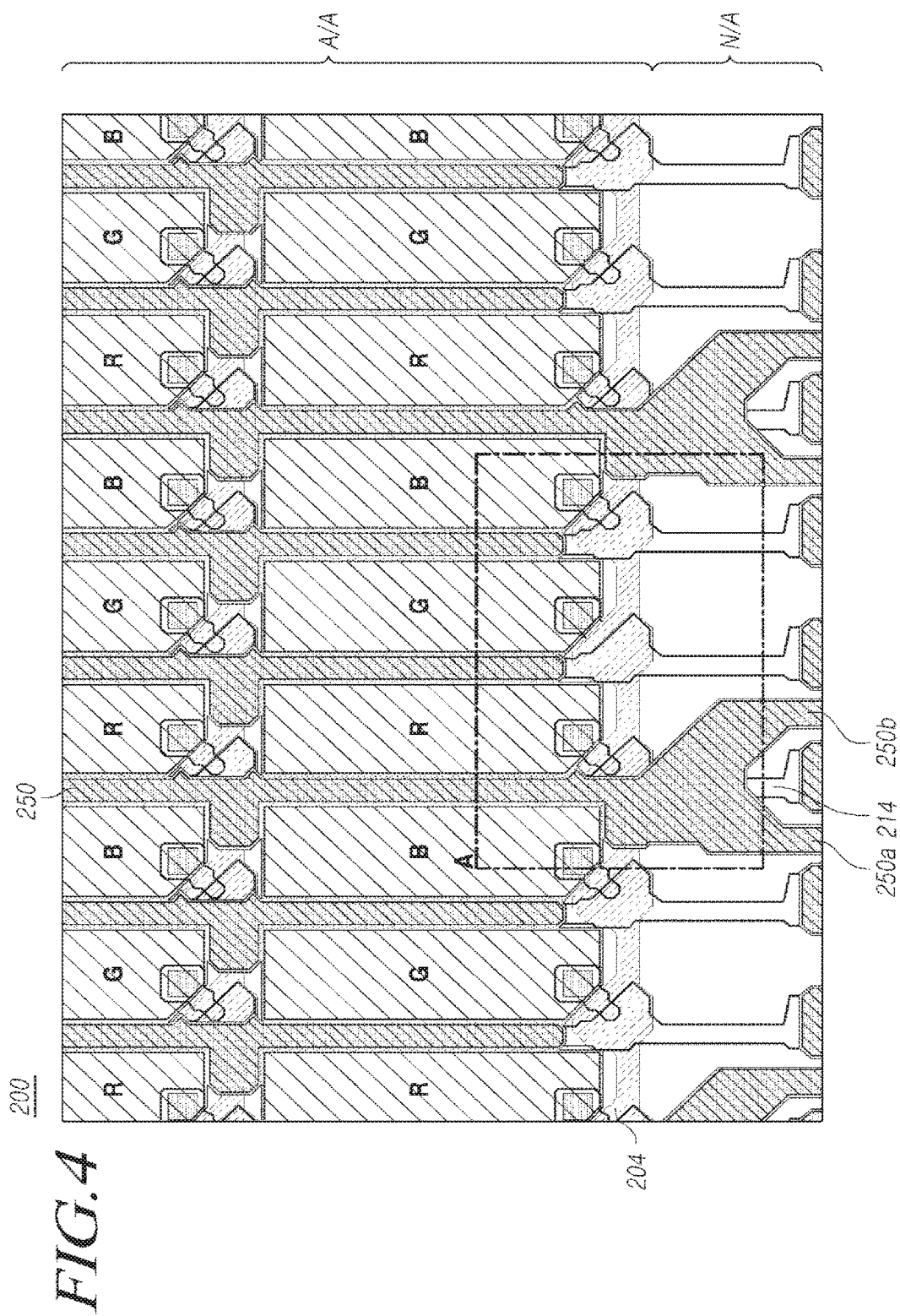
FIG. 4 is a plane view of a part of the panel illustrated in FIG. 3 according to an exemplary embodiment.
Figure 5:
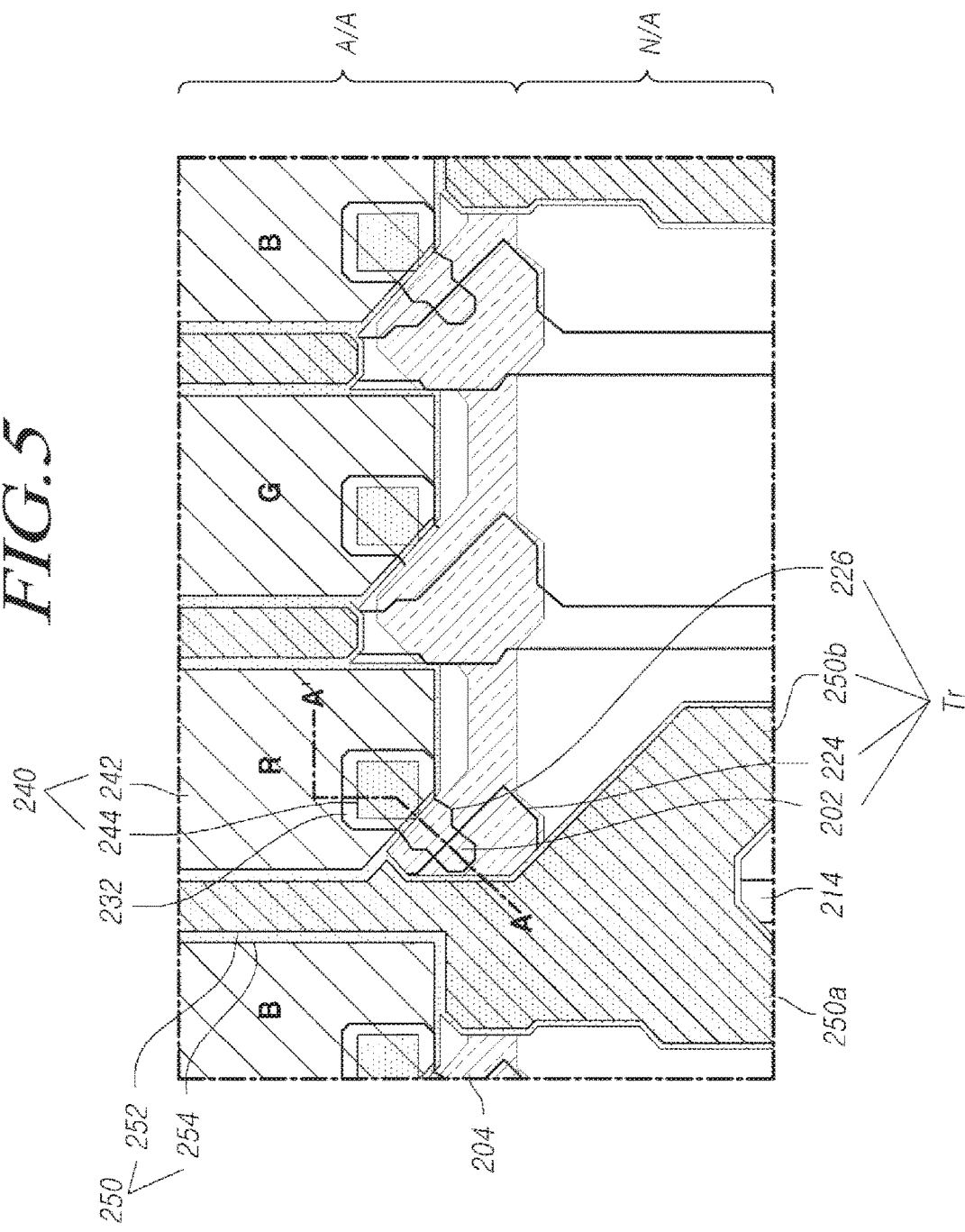
FIG. 5 is an enlarged plane view of a portion A illustrated in FIG. 4.

FIG. 4 is a plane view of a part of the panel illustrated in FIG. 3 according to an exemplary embodiment. FIG. 5 is an enlarged plane view of a portion A illustrated in FIG. 4.

Referring to FIG. 4 and FIG. 5, a panel 200 according to an exemplary embodiment includes a gate line 204 disposed in a first direction on a substrate 201 and configured to transfer a gate signal, a data line 214 disposed in a second direction on the substrate 201 and configured to transfer a data signal, and a thin-film transistor Tr disposed in each pixel P defined by intersection between the gate line 204 and the data line 214.

In other words, pixels P are defined respectively corresponding to intersections between a plurality of data lines 214 and a plurality of gate lines 204 formed on the panel 200. Herein, each pixel may be one of red (R), green (G) and blue (B) pixels.

The thin-film transistor Tr includes a gate electrode 202, an active layer 212, a source electrode 224, and a drain electrode 226.

The gate electrode 202 may be connected to the gate line 204 or integrated as one body. A gate signal to be applied through the gate line 204 is supplied to the gate electrode 202.

One of the source electrode 224 and the drain electrode 226, for example, the source electrode 224 may be connected to the data line 214 or integrated as one body. A data signal to be applied through the gate line 204 is supplied to the source electrode 224.

One of the source electrode 224 or the drain electrode 226 of the thin-film transistor, for example, the drain electrode 226 is connected to a first electrode 240 through a first contact hole 232. The first electrode 240 includes a first layer 242 located at an intersection between the data line 214 and the gate line 204 and a second layer 244 located on the first layer 242 and in the first contact hole 232. The first layer 242 of the first electrode 240 is connected to the drain electrode 226 through the first contact hole 232.

The panel 200 includes a signal line 250 disposed in each pixel P in the second direction on the substrate 201. As illustrated in FIG. 4 and FIG. 5, each signal line 250 and each data line 214 may be disposed vertically on different layers, but are not limited thereto. However, in other embodiments, the signal line can be parallel with the data line.

As illustrated in FIG. 4, a signal line 250 of a first pixel (for example, red (R) pixel) from among three pixels that make up a complete, full color pixel (for example, red (R), green (G), and blue (B) pixels) may be extended from an active area A/A to a non-active area N/A, and signal lines 250 of the other two second pixels (for example, green (G) and blue (B) pixels) may be located within the active area A/A.

In the above-described example, the signal line 250 of the first pixel from among the three pixels has been described as being extended from the active area A/A to the non-active area N/A. However, the signal line of a first pixel from among at least two pixels may be extended to the non-active area N/A and the signal line 250 of the other second pixel may be located within the active area A/A.

Herein, the signal lines 250 extended to the non-active area N/A correspond to two or more signal lines respectively connected to the plurality of touch electrodes S11 to S14, S21 to S24 and S31 to S34 described above with reference to FIG. 3. The two or more signal lines respectively connected to the plurality of touch electrodes S11 to S14, S21 to S24 and S31 to S34 have an effect of reducing a resistance of a common voltage or touch signal. The two or more signal lines respectively connected to the plurality of electrodes S11 to S14, S21 to S24 and S31 to S34 are commonly bound by a line in the non-active area N/A and then electrically connected to the touch IC 140 illustrated in FIG. 3.

For example, n number of signal lines from among 2n or 3n number of signal lines (n is a natural number greater than 1) may be extended to the non-active area N/A other than the active area A/A and the other signal lines may be located within the active area A/A.

The signal line 250 of the first pixel extended to the non-active area N/A is increased in size from the data line 214 and then branched into at least two branch signal lines 250a and 250b in the non-active area N/A.

Figure 6:
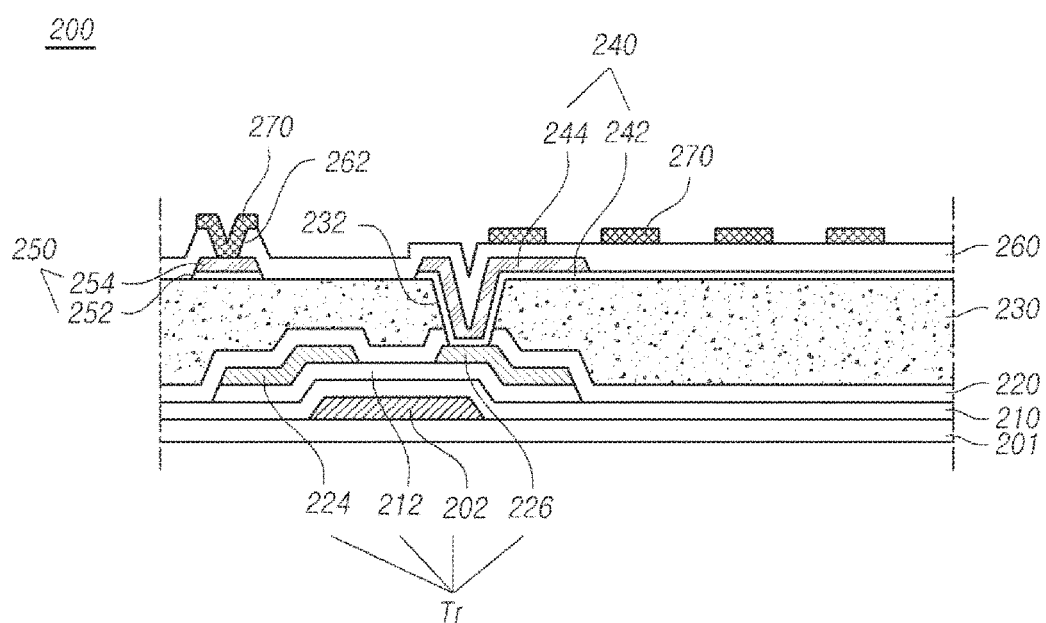
FIG. 6 is a cross-sectional view of a pixel taken along a line A-A' of FIG. 5.

FIG. 6 is a cross-sectional view of a pixel taken along a line A-A' of FIG. 5.

Referring to FIG. 6, the gate electrode 202 is located on the substrate 201 in the pixel P of the panel 200. The gate electrode 202 may have a single electrode structure or a multi-electrode structure. Further, the gate line 204 formed of the same material as the gate electrode 202 is located on the substrate 201.

The gate electrode 202 and the gate line 204 maybe formed using at least one selected from the conductive metal group consisting of aluminum (Al), tungsten (W), copper (Cu), molybdenum (Mo), chromium (Cr), titanium (Ti), molytungsten (MoW), molytitanium (MoTi), and copper/molytitanium (Cu/MoTi), but are not limited thereto. Further, the gate electrode 202 and the gate line 204 may be formed as a transparent conductive material layer using any one selected from the group consisting of ITO (Indium Tin Oxide), IZO (Indium Zinc Oxide), and CNT (Carbon Nano Tube), but are not limited thereto.

A gate insulation layer 210 is located on the gate electrode 202 and the gate line 204. Further, the active layer 212, the source electrode 224, and the drain electrode 226 are located on the gate insulation layer 210. Furthermore, the data line 214 is located on the gate insulation layer 210. The gate electrode 202, the active layer 212, the source electrode 224, and the drain electrode 226 constitute the thin-film transistor Tr.

The active layer 212 may be formed of a semiconductor material such as amorphous silicon or polysilicon such as low temperature poly silicon (hereinafter, referred to as "LTPS"), high temperature poly silicon (hereinafter, referred to as "HIPS"), or the like. Further, the active layer 212 may be formed using a semiconductor oxide material such as zinc oxide (ZO), indium gallium zinc oxide (IGZO), zinc indium oxide (ZIO), and Ga-doped ZnO (ZGO).

An interlayer insulation film 220 and a first protective layer 230 are laminated on the source electrode 224, the drain electrode 226, and the data line 214. The first protective layer 230 includes the first contact hole 232.

The first electrode 240 is located on the first protective layer 230. The first electrode 240 includes the first layer 242 connected to one of the source electrode 224 or the drain electrode 226 of the thin-film transistor through the first contact hole 232 and the second layer 244 located on the first layer 242 and in the first contact hole 232.

The first electrode 240 is a pixel electrode in an exemplary embodiment. The first layer 242 of the first electrode 240 may be formed of a metal oxide such as ITO (Indium Tin Oxide) or IZO (Indium Zinc Oxide), a mixture of a metal and an oxide such as ZnO:Al or SnO2:Sb, or a conductive polymer such as poly(3-methylthiophene), poly[3,4-(ethylene-1,2-dioxy) thiophene] (PEDT), polypyrrole and polyaniline. Further, the first layer 242 maybe formed of Carbon Nano Tube (CNT), graphene, silver nano wire, or the like.

The second layer 244 of the first electrode 240 may be located only at a contact portion where the first electrode 240 is in contact with one of the source electrode 224 or the drain electrode 226 of the thin-film transistor Tr within the first contact hole 232, but may be wider or narrower than the contact portion. The second layer 244 of the first electrode 240 may be formed using at least one selected from the conductive metal group consisting of aluminum (Al), tungsten (W), copper (Cu), molybdenum (Mo), chromium (Cr), titanium (Ti), molytungsten (MoW), molytitanium (MoTi), and copper/molytitanium (Cu/MoTi), but is not limited thereto.

The signal line 250 including a first signal line layer 252 located on the first protective layer 230 and a second signal line layer 254 located on the first signal line layer 252 is disposed. The first signal line layer 252 may be formed of the same material on the same layer as the first layer 242 of the first electrode 240, but is not limited thereto. The second signal line layer 254 may be formed of the same material on the same layer as the second layer 244 of the first electrode 240, but is not limited thereto.

A second protective layer 260 is disposed on the first electrode 240 and the signal line 250 and includes a second contact hole 262 on the signal line. A second electrode 270 is located on the second protective layer 260. The second electrode 270 is connected to the signal line 250 through the second contact hole 262. In other words, the second electrode 270 is in contact with the second signal line layer 254 of the signal line 250 through the second contact hole 262.

Since the second electrode 270 is electrically connected to the signal line 250, the second electrode 270 is supplied with a common voltage and a touch driving signal through the signal line 250. The second electrode 270 functions as a common electrode in a display mode and also functions as a touch electrode to be applied with a touch driving signal in a touch mode.

Figure 7:
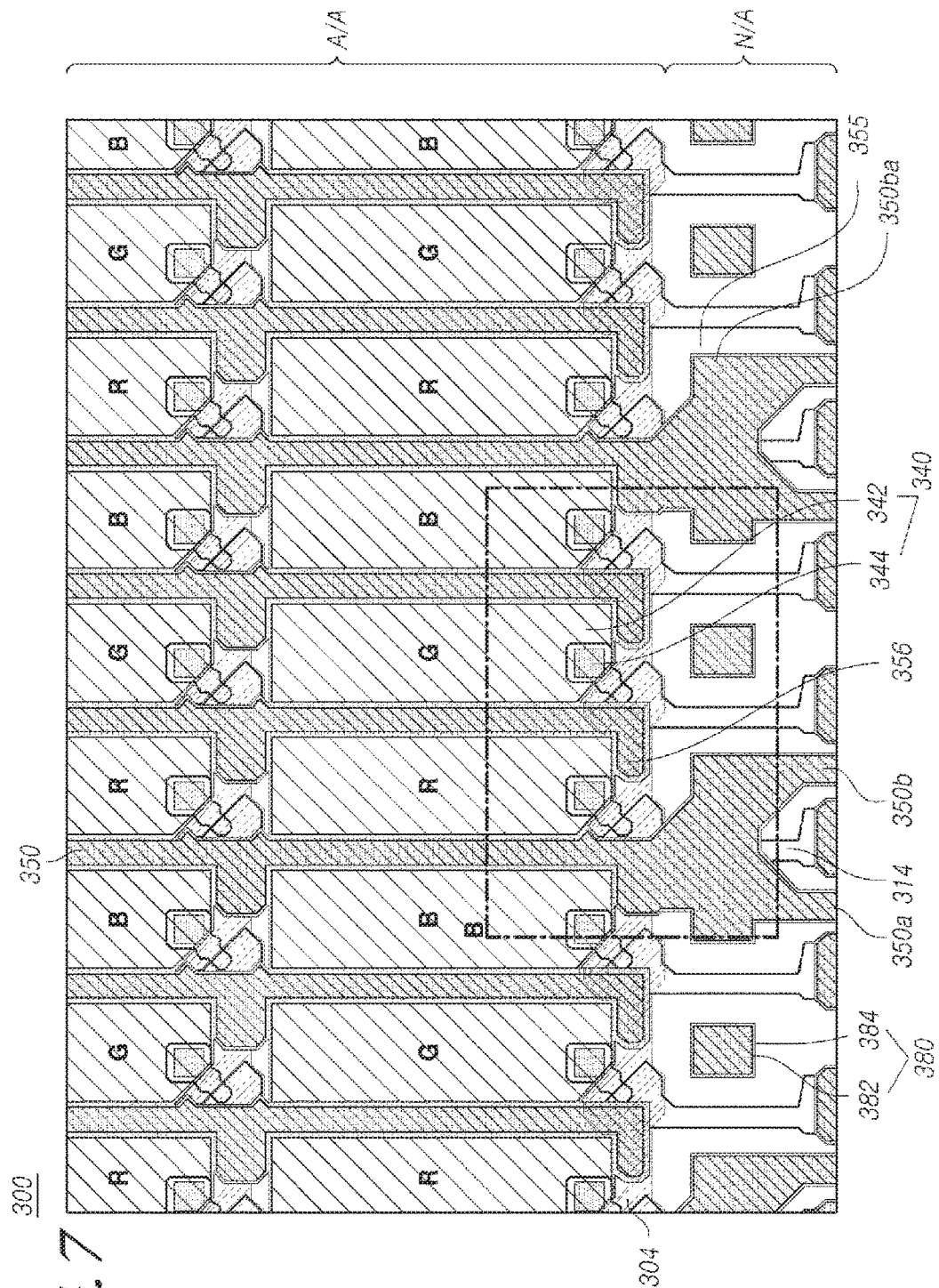
FIG. 7 is a plane view of a part of the panel illustrated in FIG. 3 according to another exemplary embodiment.
Figure 8:
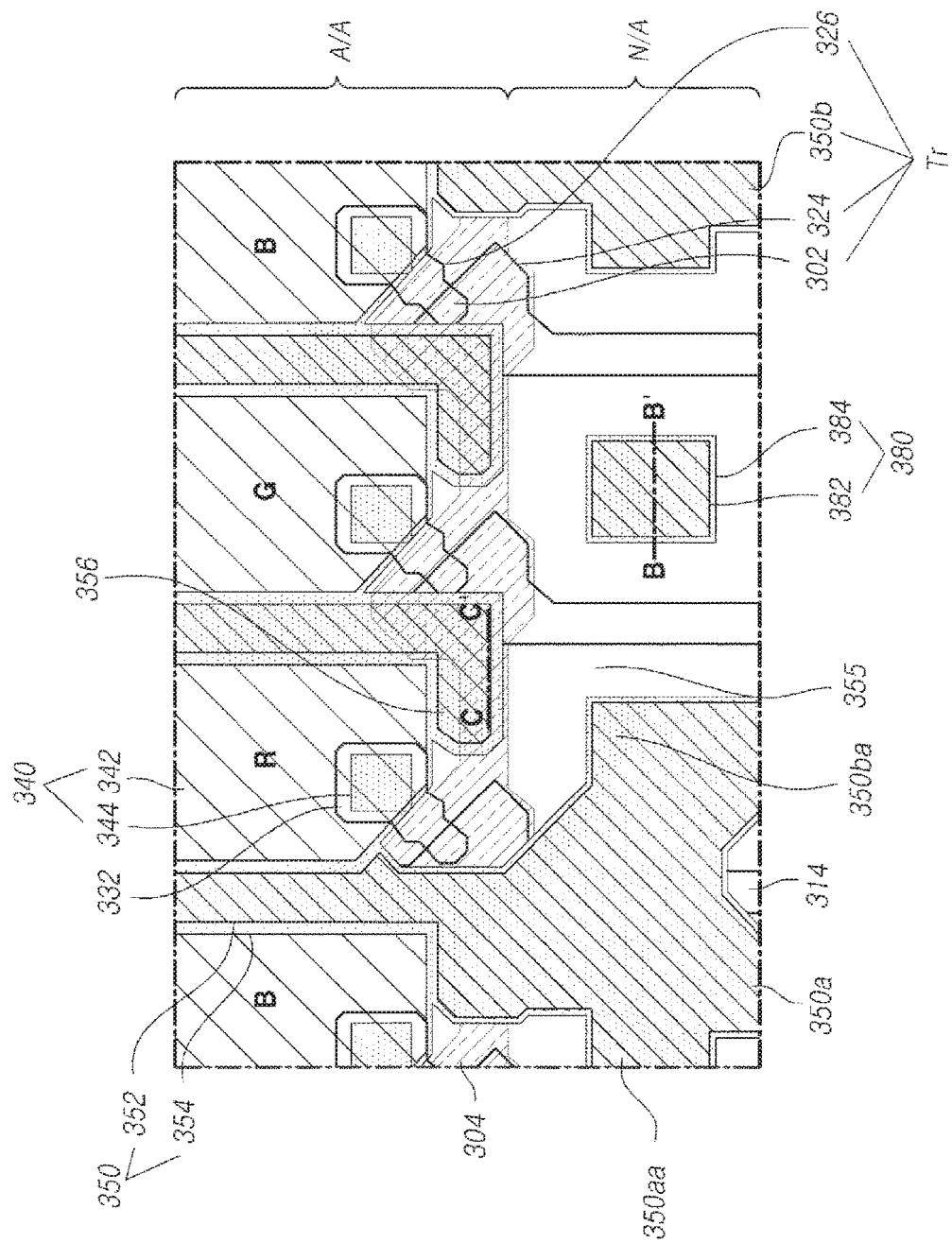
FIG. 8 is an enlarged plane view of a portion B illustrated in FIG. 7.

FIG. 7 is a plane view of a part of the panel illustrated in FIG. 3 according to another exemplary embodiment. FIG. 8 is an enlarged plane view of a portion B illustrated in FIG. 7.

Referring to FIG. 7 and FIG. 8, a panel 300 according to another exemplary embodiment is generally identical to the panel 200 according to the exemplary embodiment described with reference to FIG. 4 and FIG. 8.

The panel 300 includes a gate line 304 disposed in a first direction on a substrate 301 and configured to transfer a gate signal, a data line 314 disposed in a second direction on the substrate 301 and configured to transfer a data signal, and a thin-film transistor Tr disposed in each pixel P defined by intersection between the gate line 304 and the data line 314. However, in other embodiments, the signal line can be parallel with the data line.

The thin-film transistor Tr includes a gate electrode 302, an active layer 312, a source electrode 324, and a drain electrode 326. A gate insulation layer 310 is located on the gate electrode 302.

An interlayer insulation film 320 and a first protective layer 330 are laminated on the source electrode 324 and the drain electrode 326.

One of the source electrode 324 or the drain electrode 326 of the thin-film transistor, for example, the drain electrode 326 is connected to a first electrode 340 through a first contact hole 332. The first electrode 340 includes a first layer 342 located at an intersection between the data line 314 and the gate line 304 and a second layer 344 located on the first layer 342 and in the first contact hole 332. The first layer 342 of the first electrode 340 is connected to the drain electrode 326 through the first contact hole 332.

The panel 300 includes a signal line 350 disposed in each pixel P in the second direction on the substrate 301.

As illustrated in FIG. 4, a signal line 350 of a first pixel (for example, red (R) pixel) from among three pixels (for example, red (R), green (G), and blue (B) pixels) maybe extended from the active area A/A to the non-active area N/A, and signal lines 350 of the other two second pixels (for example, green (G) and blue (B) pixels) may be located within the active area A/A.

Figure 9:
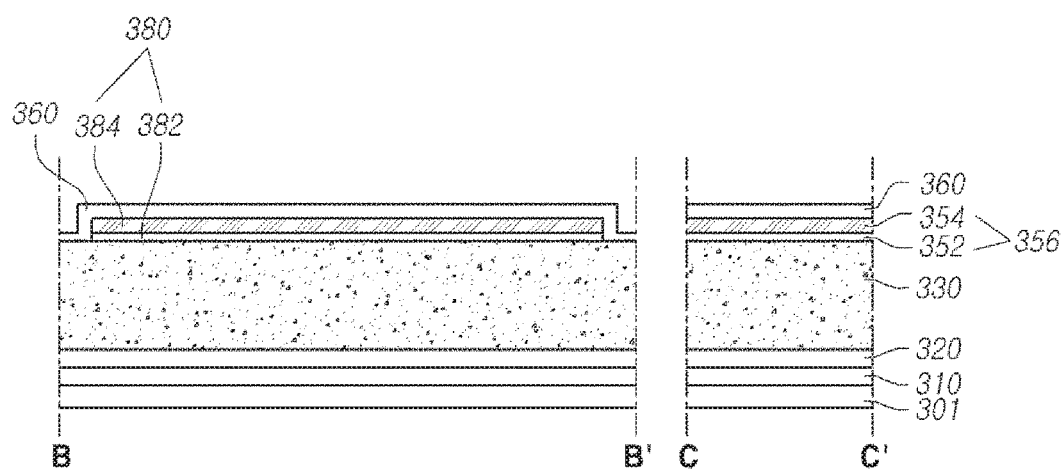
FIG. 9 is a cross-sectional view taken along a line B-B' and a line C-C' of FIG. 8.

FIG. 9 is a cross-sectional view taken along a line B-B' and a line C-C' of FIG. 8.

Referring to FIG. 8 and FIG. 9, the panel 300 according to another exemplary embodiment further includes a dummy pattern 380 located in the non-active area N/A adjacent to the first contact hole 332 of the second pixel. The dummy pattern 380 has the same laminated structure as the above-described signal line 350. That is, the dummy pattern 380 may include a first dummy pattern layer 382 formed on the first protective layer 330 of the same material on the same layer as the first layer 342 of the first electrode 340 and a second dummy pattern layer 384 formed on the first dummy pattern layer 382 of the same material on the same layer as the second layer 344 of the first electrode 340. A second protective layer 360 is located on the dummy pattern 380.

As described above, the signal line 350 of each pixel and the data line 314 may be disposed respectively corresponding to different layers. The signal line 350 of the first pixel extended to the non-active area N/A is increased in size from the data line 314 and then branched into at least two branch signal lines 350a and 350b in the non-active area N/A. Herein, the two branch signal lines 350a and 350b additionally include extension areas 350aa and 350ba, respectively, further extended in size from the data line 314 to an empty space 355 in the non-active area N/A as compared with those illustrated in FIG. 4 and FIG. 5.

Meanwhile, as illustrated in FIG. 8, one end 356 of the signal line 350 of the second pixel is bent in the first direction. In other words, the one end 356 of the signal line 350 of the second pixel may be bent at a position corresponding to a layer different from the gate line 304 extended in the first direction, but is not limited thereto.

The one end 356 of the signal line 350 also includes a first signal line layer 352 and a second signal line layer 354 located on the first protective layer 330 in the same manner as the laminated structure of the signal line 350. The second protective layer 360 is located on the signal line 350.

FIG. 10 through FIG. 18 are process diagrams of a method for fabricating a display device according to yet another exemplary embodiment.

Figure 10:
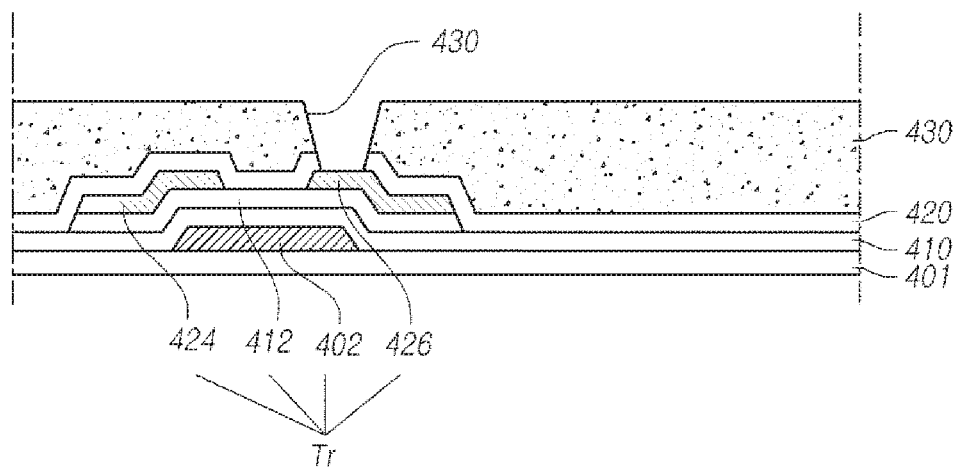
FIG. 10 through FIG. 18 are process diagrams of a method for fabricating a display device according to yet another exemplary embodiment.

Referring to FIG. 10, a thin-film transistor Tr is formed on a substrate 401. The thin-film transistor Tr includes a gate electrode 402, an active layer 412, a source electrode 424, and a drain electrode 426. A gate insulation layer 410 is located on the gate electrode 402.

Then, the interlayer insulation film 420 and a first protective layer 430 including a first contact hole 432 are formed on the thin-film transistor Tr.

Then, referring to FIG. 11 through FIG. 16, a first electrode 440 and a signal line 450 are formed on the first protective layer 430 using a photoresist PR.

Figure 11:
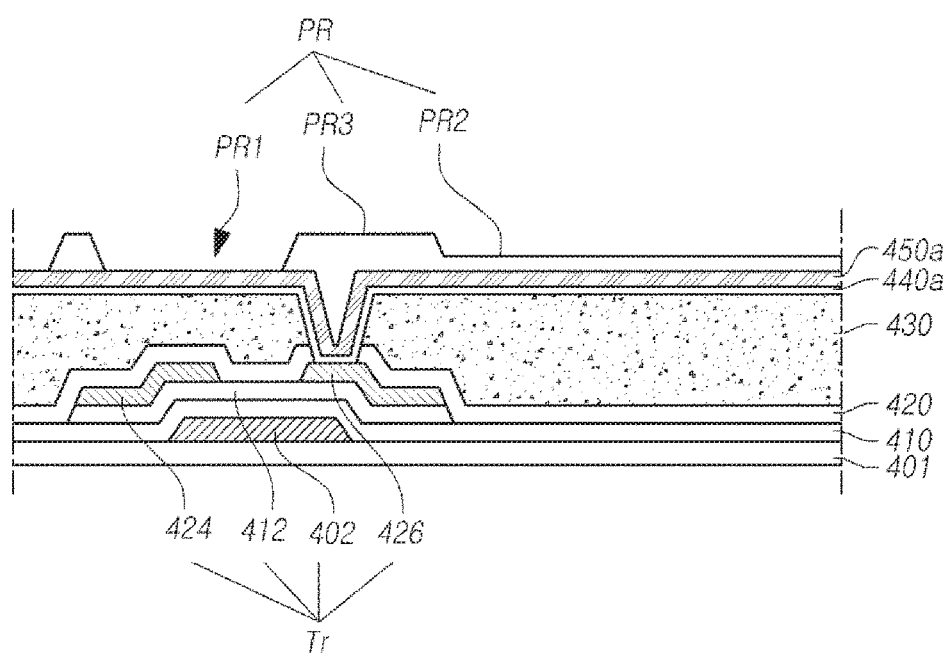

Specifically, referring to FIG. 11, a first electrode material 440a and a signal line material 450a are deposited on the first protective layer 430. Then, the photoresist PR is formed on the laminated structure illustrated in FIG. 10 using a photomask. In an exemplary embodiment, the photoresist PR having first to third heights PR1, PR2, and PR3 is formed using a halftone mask or a diffraction mask. An area having the first height PR1 may be an open area where the photoresist PR is not present.

In other words, a photomask PM may be a halftone photomask including areas corresponding to the first to third heights of the photoresist PR, and, thus, a first portion and a second portion respectively corresponding to a second layer 444 of the first electrode 440 and a second signal line layer 454 may be different in height.

A wet etching is performed to the signal line material 450a using the photoresist PR. The signal line material 450a in a photoresist area PR corresponding to the first height PR1 is patterned by the wet etching.

Figure 12:
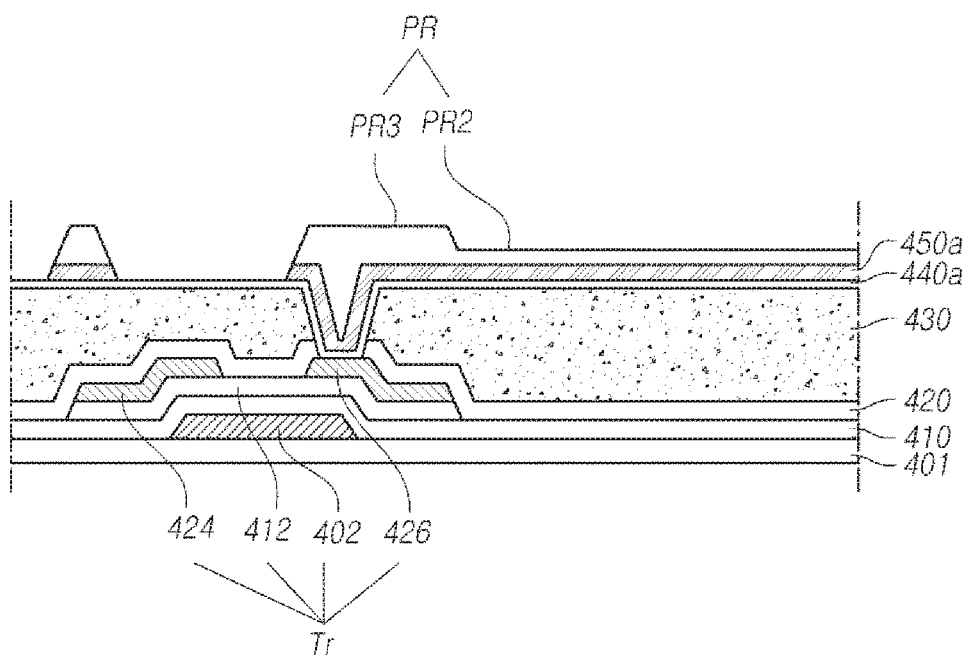

Referring to FIG. 12, a dry etching is performed to remove the second height PR2 of the photoresist PR and lower the third height PR3 to the second height PR2. Since the second height PR2 of the photoresist PR is removed, an area covered by the second height PR2 of the photoresist PR is exposed.

Figure 13:
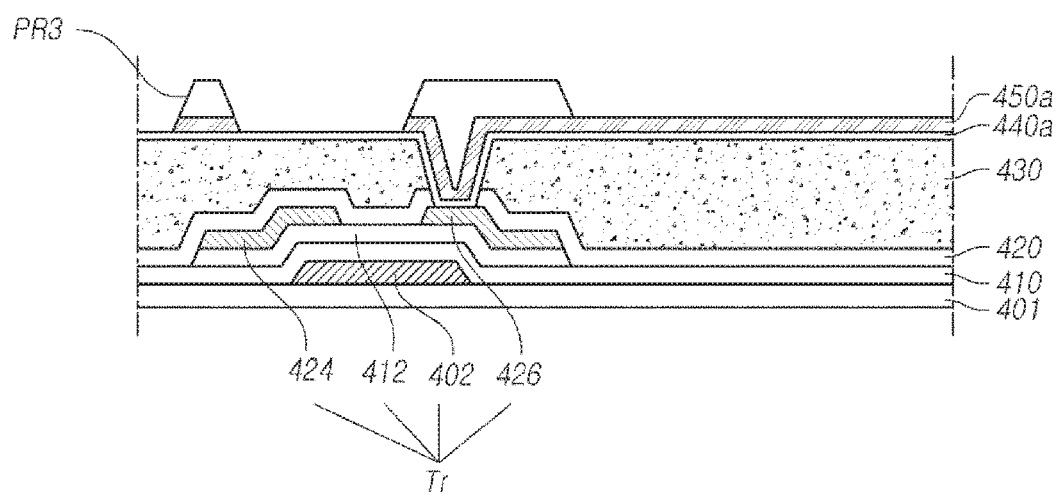

Referring to FIG. 13, a wet etching is performed to the first electrode material 440a using the photoresist PR of which only the third height PR3 is maintained. The first electrode material 440a in the photoresist PR area corresponding to the second height PR2 is patterned by the wet etching.

Figure 14:
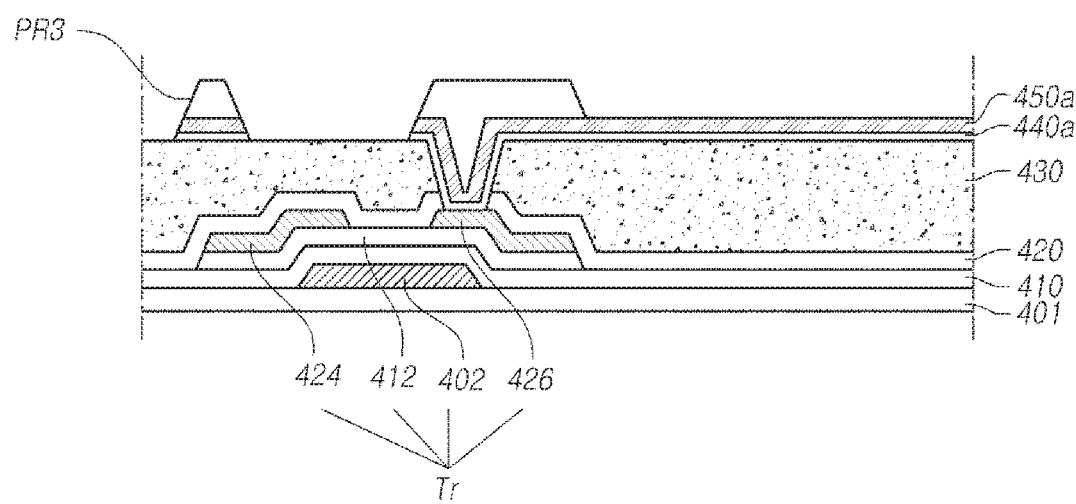

Referring to FIG. 14, a wet etching is performed to the signal line material 450a using the photoresist PR of which only the third height PR3 is maintained. The signal line material 450a in the photoresist PR area corresponding to the second height PR2 is patterned by the wet etching.

Figure 15:
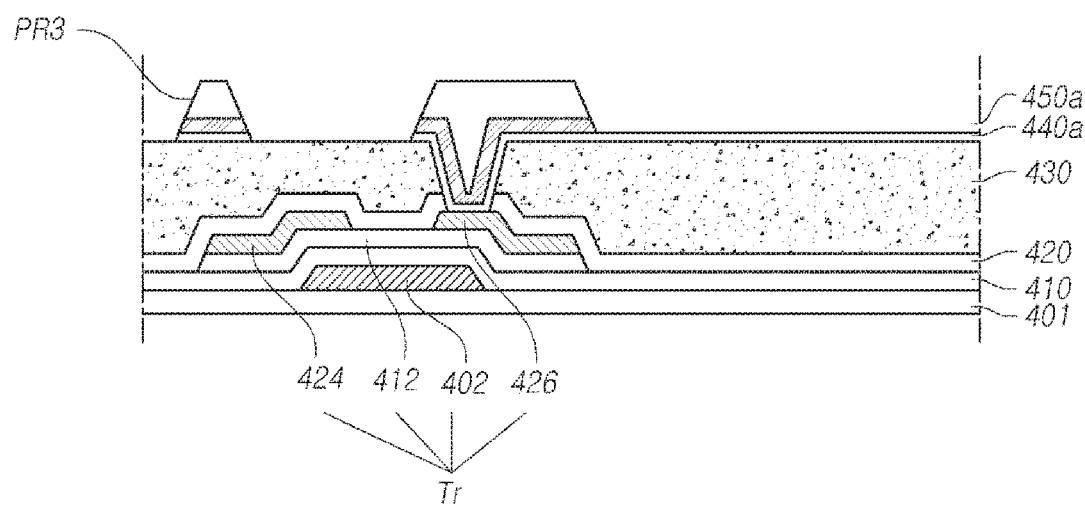

Referring to FIG. 15, the photoresist PR of which only the third height PR3 is maintained is stripped.

Figure 16:
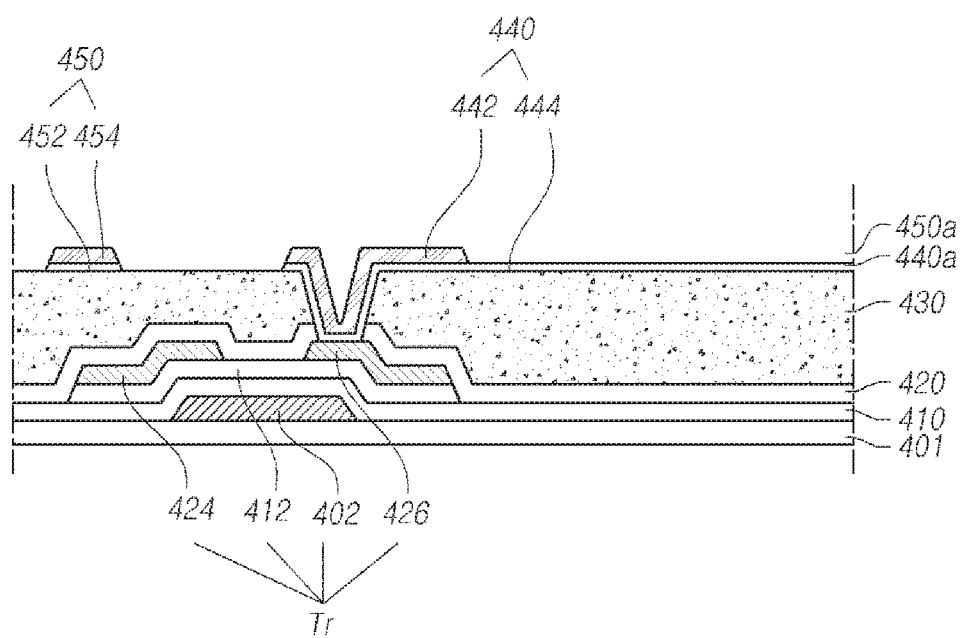

As a result, as shown in FIG. 16, the first electrode 440 including a first layer 442 connected to one of the source electrode 424 or the drain electrode 426 of the thin-film transistor Tr through the first contact hole 432 and the second layer 444 located on the first layer 442 and in the first contact hole 432, and the signal line 450 including a first signal line layer 452 formed on the first protective layer 430 of the same material on the same layer as the first layer 442 of the first electrode 440 and a second signal line layer 454 located on the first signal line layer 452 of the same material on the same layer as the second layer 444 of the first electrode 440 are formed.

Figure 17:
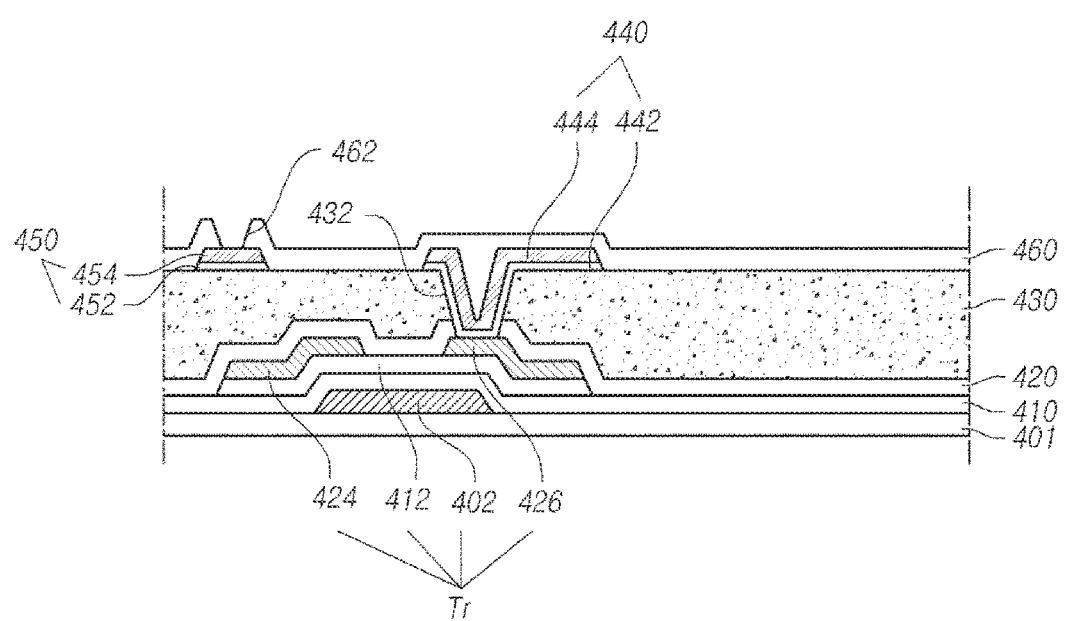

Then, referring to FIG. 17, a second protective layer 460 which has a second contact hole 462 is formed on the first electrode 440 and the signal line 450.

Figure 18:
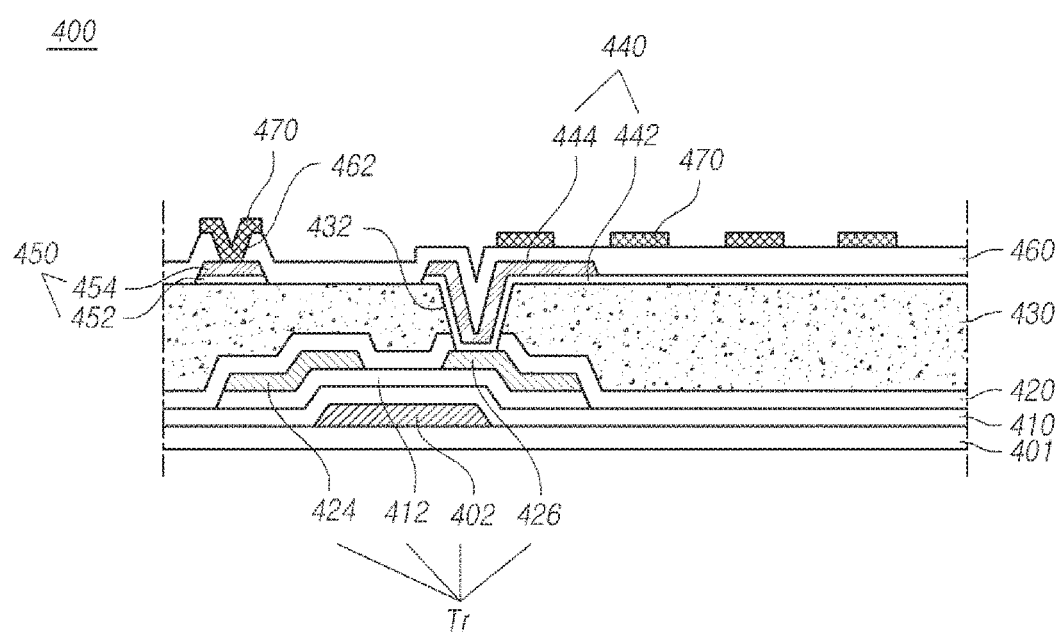

Then, referring to FIG. 18, a second electrode 470 connected to the signal line 450 through the second contact hole 462 is formed on the second protective layer 460.

Finally, a display device 400 identical to the display device 200 described with reference to FIG. 6 is completed.

Figure 19:
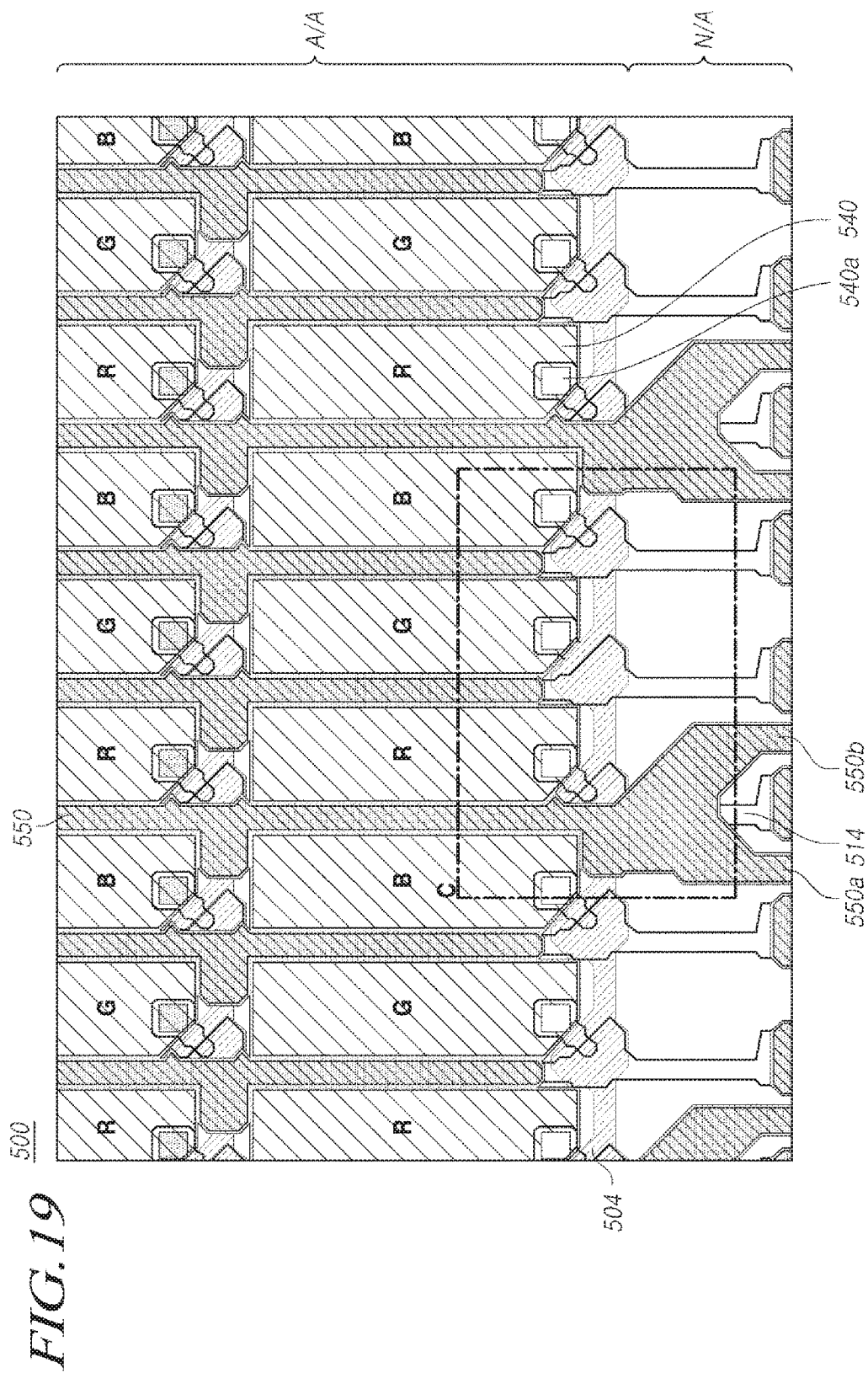
FIG. 19 is a plane view of a part of the panel illustrated in FIG. 3 according to a Comparative Example.
Figure 20:
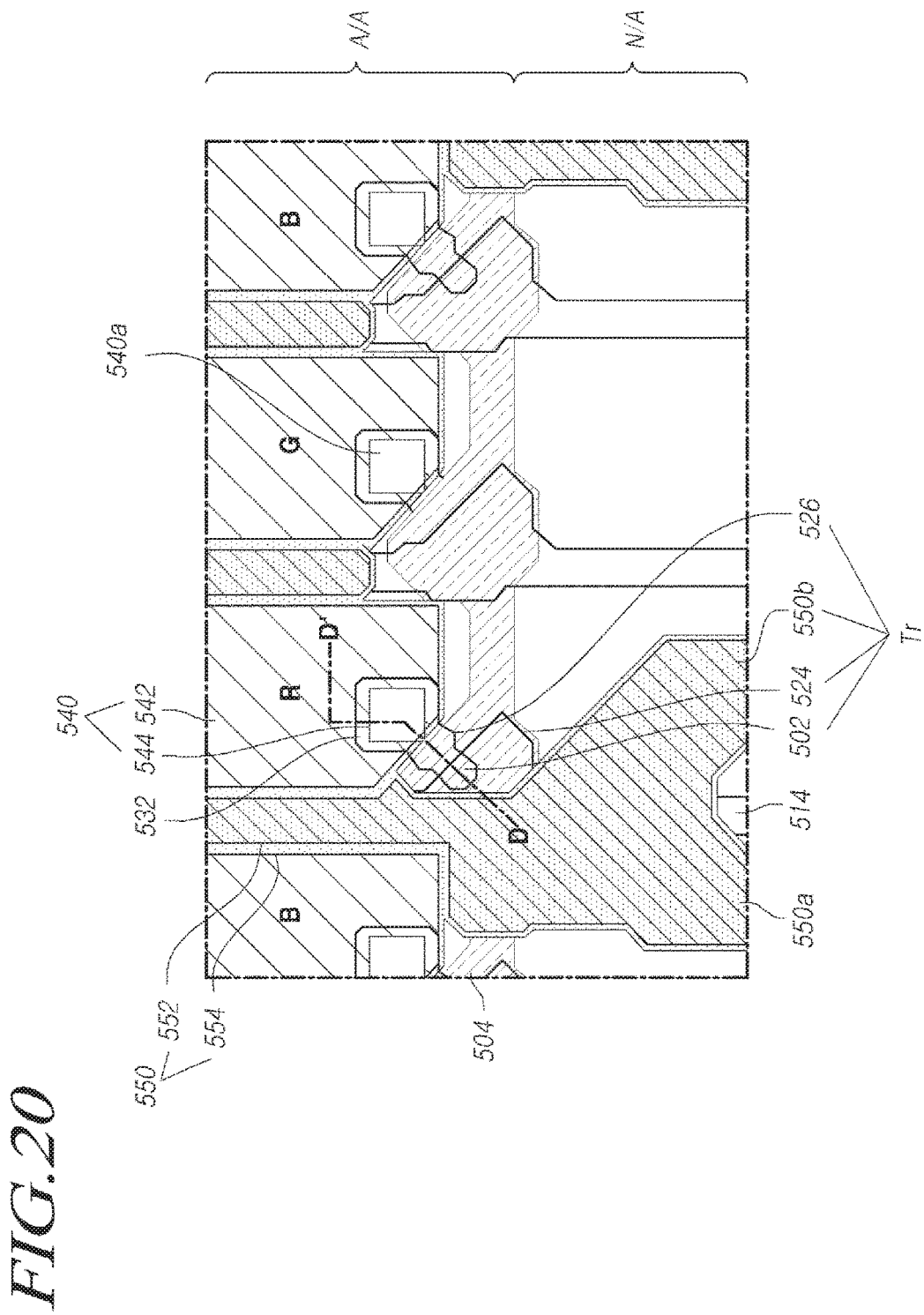
FIG. 20 is an enlarged plane view of a portion C illustrated in FIG. 19.
Figure 21:
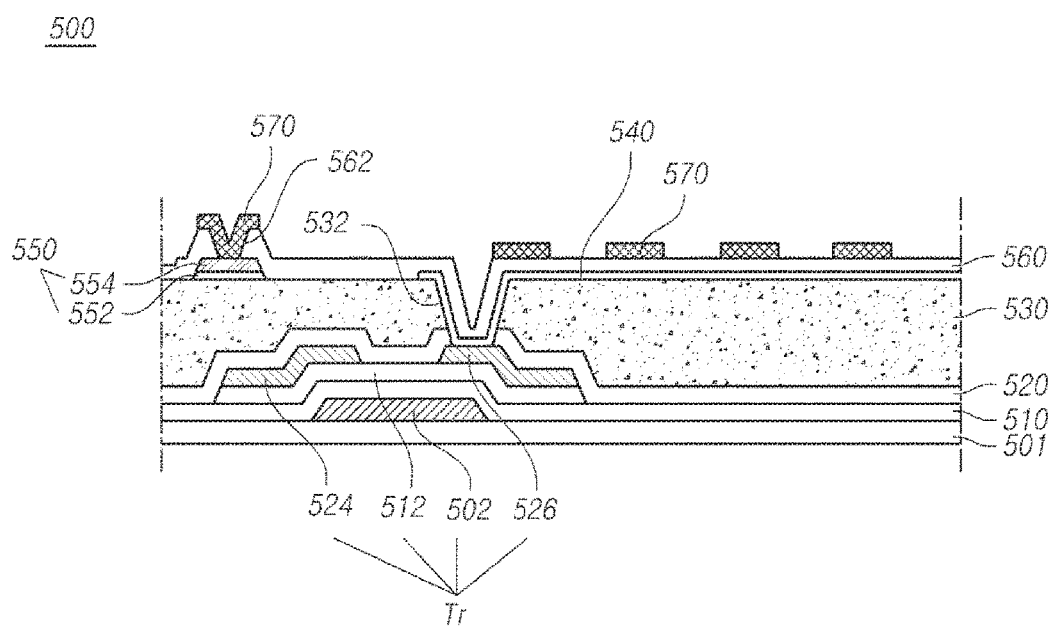
FIG. 21 is a cross-sectional view taken along a line D-D' of FIG. 20.

FIG. 19 is a plane view of a part of the panel illustrated in FIG. 3 according to a Comparative Example. FIG. 20 is an enlarged plane view of a portion C illustrated in FIG. 19. FIG. 21 is a cross-sectional view taken along a line D-D' of FIG. 20. The Comparative Example is not admitted as prior art. This is provided solely to illustrate the benefits of the invented structure and is not admitted to as qualifying as prior art.

Referring to FIG. 19 and FIG. 20, a panel 500 according to Comparative Example has some portions that are the same as the panels 200 and 300 according to the exemplary embodiments described with reference to FIG. 4 and FIG. 8.

The panel 500 includes a gate line 504 disposed in a first direction on a substrate 501 and configured to transfer a gate signal, a data line 514 disposed in a second direction on the substrate 501 and configured to transfer a data signal, and a thin-film transistor Tr disposed in each pixel P defined by intersection between the gate line 504 and the data line 514.

The thin-film transistor Tr includes a gate electrode 502, an active layer 512, a source electrode 524, and a drain electrode 526. A gate insulation layer 510 is located on the gate electrode 502.

An interlayer insulation film 520 and a first protective layer 530 are laminated on the source electrode 524 and the drain electrode 526.

One of the source electrode 524 or the drain electrode 526 of the thin-film transistor, for example, the drain electrode 526 is connected to a first electrode 540 through a first contact hole 532. The first electrode 540 is different from the first electrodes 240 and 340 of the display devices 200 and 300 according to an exemplary embodiment and another exemplary embodiment in that a layer formed of the same material on the same layer as a second signal line 554 of a signal line is not disposed in the first contact hole 532.

The panel 500 includes the signal line 550 disposed in each pixel P in the second direction on the substrate 501.

The signal line 550 including a first signal line layer 552 located on the first protective layer 330 and the second signal line layer 554 located on the first signal line layer 552 is disposed. The first signal line layer 552 may be formed of the same material on the same layer as the first electrode 540, but is not limited thereto.

A second protective layer 560 is located on the first electrode 540 and the signal line 550 and includes a second contact hole 562 in the signal line. A second electrode 570 is located on the second protective layer 560. The second electrode 570 is connected to the signal line 550 through the second contact hole 562. In other words, the second electrode 570 is in contact with the second signal line layer 554 of the signal line 550 through the second contact hole 562.

As illustrated in FIG. 19, a signal line 550 of a first pixel (for example, red (R) pixel) from among three pixels (for example, red (R), green (G), and blue (B) pixels) may be extended from an active area A/A to a non-active area N/A, and signal lines 550 of the other two second pixels (for example, green (G) and blue (B) pixels) may be located within the active area A/A.

The signal line 550 of the first pixel extended to the non-active area N/A is increased in size from the data line 514 and then branched into at least two branch signal lines 550a and 550b in the non-active area N/A.

The display device 500 according to Comparative Example does not include the dummy pattern 380 or the one end 355→356 of the signal line 350 extended in the second direction illustrated in FIG. 8 through FIG. 10.

The first electrode 540 and the signal line 550 described with reference to FIG. 19 through FIG. 21 may need a halftone process for the same reason as described with reference to FIG. 11 through FIG. 14. When a halftone process is performed to the first electrode 540 and the signal line 550, the first electrode 540 located at an interface between the active area A/A and the non-active area N/A as illustrated in FIG. 19 and FIG. 20 includes a lost portion 540a where apart of the first electrode 540 located within the first contact hole 532 in contact with the drain electrode 526 and the first electrode 540 is lost since a thickness of a halftone photoresist is decreased. Thus, a contact failure may occur between the drain electrode 526 and the first electrode 540, and a dark spot defect may occur frequently due to the contact failure.

Specifically, when the halftone process is performed to the first electrode 540 and the signal line 550, a thickness of a halftone area corresponding to the first electrode 540 located at the interface (outermost area of the active area A/A) between the active area A/A and the non-active area N/A and a thickness of a halftone area corresponding to the first electrode 540 located within the active area A/A (i.e., the second height areas PR2 of the photoresist PR described with reference to FIG. 11 through FIG. 14) are measured, and the result thereof is as listed in Table 1.

TABLE 1

| Measurement | Exposure | | |
| --- | --- | --- | --- |
| position | 65 mJ (ref.) | 68 mJ | 71 mJ |
| Central area in active area | 4,100 | 3,200 | 2,933 |
| Outermost area of active area | 2,407 | 2,177 | 1,460 |
| Difference | 1,693 | 1,623 | 1,473 |

As can be seen from Table 1, according to the measurement result of a thickness of a halftone area corresponding to the first electrode 540 located at the interface (outermost area of the active area A/A) between the active area A/A and the non-active area N/A and a thickness of a halftone area corresponding to the first electrode 540 located within the active area A/A (i.e. the second height areas PR2 of the photoresist PR described with reference to FIG. 11 through FIG. 14) when the halftone process is performed to the first electrode 540 and the signal line 550, the thickness of the first electrode 540 located at the interface between the active area A/A and the non-active area N/A is decreased.

Since a pattern of the first electrode 540 and the signal line 550 is not present around the first electrode 540 located at the interface (outermost area of the active area A/A) between the active area A/A and the non-active area N/A, the first electrode 540 located at the interface has a greater size and has a smaller halftone thickness than the other area during a photo process.

One issue is that the photoresist PR including both the first electrode 540 and the signal line 550 is not present under the lost portion 540a. Thus, the first electrode 540 located at the interface has a greater size and has a smaller halftone thickness than the other area during a photoresist process.

Meanwhile, as for the first electrode 540 located within the active area A/A, an area including both the first electrode 540 and the signal line 550 is present under the first electrode 540 as illustrated in FIG. 19. Thus, there may be an insignificant loading effect.

Meanwhile, in the display devices 200 and 300 according to the exemplary embodiments illustrated in FIG. 4 and FIG. 8, the first electrodes 240 and 340 located at the interface (outermost area of the active area A/A) between the active area A/A and the non-active area N/A includes the second layers 244 and 342→344 on the first layers 242 and 342 of the first electrodes 240 and 340 in the first contact holes 232 and 332, respectively. Thus, the first electrodes 240 and 340 have a thickness corresponding to the third height PR3 which is the greatest height of the photoresist PR including both the first layers 242 and 342 and the second layers 244 and 342→344, respectively. Therefore, loss does not occur, and occurrence of a dark spot caused by the loss can be improved.

Further, in the display device 300 according to the exemplary embodiments illustrated in FIG. 8, the dummy pattern layer 380 including the first dummy pattern layer 382 and the second dummy pattern layer 384 are disposed under the first electrode 340 located at the interface (outermost area of the active area A/A) between the active area A/A and the non-active area N/A and the two branch signal lines 350a and 350b of the signal line 350 further include the extension areas 350aa and 350ba, respectively. Thus, when a photo process is performed to the first electrode 340 and the signal line 350, a loading effect can be minimized and thus a dark spot defect caused by loss of the first electrode 340 can be improved.

Specifically, when a halftone process is performed to the first electrode 340 and the signal line 350, a thickness of a halftone area corresponding to the first electrode 340 located at an interface (outermost area of the active area A/A) between the active area A/A and the non-active area N/A and a thickness of a halftone area corresponding to the first electrode 340 located within the active area A/A (i.e. the second height areas PR2 of the photoresist PR described with reference to FIG. 11 through FIG. 14) are measured, and the result thereof is as listed in Table 2.

TABLE 2

| | Measurement result | | |
| --- | --- | --- | --- |
| Measurement position | Example 1 | Example 2 | Example 3 |
| Central area in active area | 4,420 | 4,520 | 4,380 |
| Outermost area of active area | 4,395 | 4,476 | 4,334 |
| Difference | 25 | 44 | 46 |

As can be seen from Table 2, according to the measurement result of a thickness of a halftone area corresponding to the first electrode 240 located at the interface (outermost area of the active area A/A) between the active area A/A and the non-active area N/A and a thickness of a halftone area corresponding to the first electrode 240 located within the active area A/A (i.e. the second height areas PR2 of the photoresist PR described with reference to FIG. 11 through FIG. 14) when a halftone process is performed to the first electrode 240 and the signal line 250, there is a smaller difference in thickness between the first electrode 240 located at the interface between the active area A/A and the non-active area N/A and the first electrode 240 located within the active area A/A.

Figure 22:
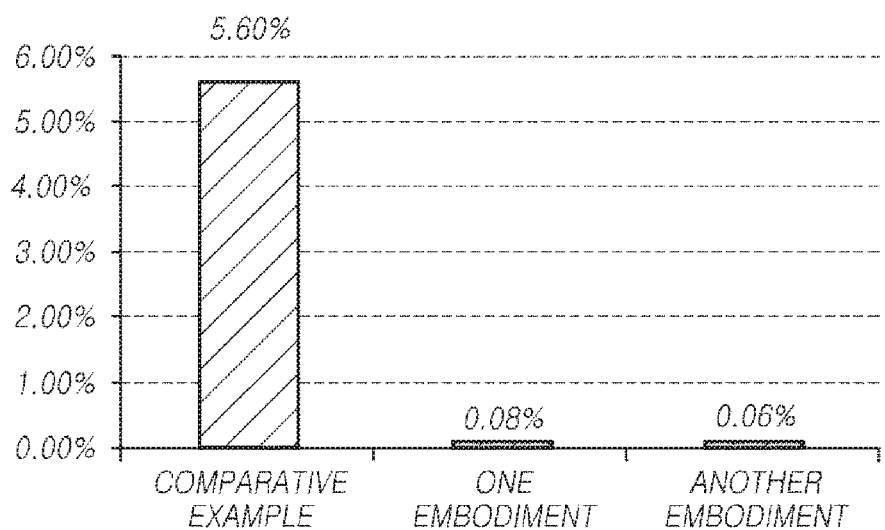
FIG. 22 is a graph comparing a dark spot defect rate between the display device according to the Comparative Example illustrated in FIG. 19, the display device according to an exemplary embodiment illustrated in FIG. 4, and the display device according to another exemplary embodiment illustrated in FIG. 8.

FIG. 22 is a graph comparing a dark spot defect rate between the display device according to Comparative Example illustrated in FIG. 19, the display device according to an exemplary embodiment illustrated in FIG. 4, and the display device according to another exemplary embodiment illustrated in FIG. 8.

Referring to FIG. 22, a dark spot defect rate of the display device 500 according to Comparative Example is 5.60%, whereas dark spot defect rates of the display device 200 according to an exemplary embodiment illustrated in FIG. 4 and the display device 300 according to another exemplary embodiment illustrated in FIG. 8 are 0.08% and 0.006%, respectively. Thus, it is confirmed that a dark spot defect is greatly improved.

According to the above-described exemplary embodiments, it is possible to provide a fabricating method for reducing detailed processes of a touch screen panel-integrated display device and a display device to which the fabricating method is applied.

The foregoing description and the accompanying drawings are provided only to illustrate the technical conception of the present disclosure, but it will be understood by a person having ordinary skill in the art that various modifications and changes such as combinations, separations, substitutions, and alterations of the components may be made without departing from the scope of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device comprising:
   a substrate having an active area and a non-active area;
   a first thin-film transistor located in a first pixel in the active area;
   a gate line coupled to the first thin-film transistor;
   a data line coupled to the first thin-film transistor;
   a first protective layer located on the first thin-film transistor and in which a first contact hole is formed;
   a first electrode including a first layer connected to a drain electrode of the first thin-film transistor through the first contact hole and a second layer on the first layer;
   a first signal line including a first signal line layer on the first protective layer and a second signal line layer on the first signal line layer;
   a second electrode connected to the signal line through a second contact hole;
   a second pixel in the active area, the second pixel having a second thin film transistor and a second contact hole in the first protective layer;
   a dummy pattern located in the non-active area adjacent to the second contact hole of the second pixel and including a first dummy pattern layer formed on the first protective layer of the same material and on the same layer as the first layer of the first electrode and a second dummy pattern layer formed on the first dummy pattern layer of the same material on the same layer as the second layer of the first electrode.

2. The display device according to claim 1, further comprising:
   a second protective layer including a second contact hole on the signal line,
   wherein the second electrode is connected to the signal line through the second contact hole.

3. The display device according to claim 1, wherein the second electrode functions as a common electrode to be applied with a common voltage through the signal line in a display driving mode, and the second electrode functions as a touch electrode to be applied with a touch driving signal through the signal line in a touch driving mode.

4. The display device according to claim 1, wherein the signal line is parallel with the data line.

5. The display device according to claim 1, wherein the signal line of the first pixel is extended to a non-active area and the signal line of the second pixel is located solely within the active area.

6. The display device according to claim 1, further including a third pixel and wherein the signal line of the first pixel from among the three pixels is extended to the non-active area and the signal lines of the other two second pixels are located within the active area.

7. The display device according to claim 1, wherein the signal line includes at least two branch signal lines in the non-active area, and the two branch signal lines additionally include extension areas in the non-active area.

8. The display device according to claim 7, wherein one end of the signal line of the second pixel is bent in the first direction.

9. The display device according to claim 8, further including a second signal line, wherein the one end of the second signal line is disposed on a gate line of the second thin film transistor.

10. The display device according to claim 9, wherein the two branch signal lines, the dummy pattern, the two extension areas, and the one end of the first signal line have the same material.

11. The display device according to claim 7, wherein the dummy pattern is formed between the first and second signal lines.

12. The display device according to claim 1, wherein the signal line and the first electrode have a same material for the first layer of the signal line and the first layer of the first electrode, and a same material for the second layer of the signal line and the second layer of the first electrode.

13. The display device according to claim 12, wherein the second electrode electrically contacts with the second layer of the signal line.

14. The display device according to claim 13, wherein the first signal line is selectively connected to the second electrode to transfer one of a common voltage in the display driving mode, and a touch driving signal in the touch driving mode.

15. The display device according to claim 13, wherein at least two of the second electrodes correspond to one unit touch electrode area.

16. The display device according to claim 15, wherein the unit touch electrode area is connected to at least one of the signal lines.

17. The display device according to claim 12, wherein the second layer of the first electrode covers a part of the first layer of the first electrode over the second protective layer.

18. The display device according to claim 1, wherein a material of the first layer of the first electrode is made of at least one of ITO, IZO, a mixture of a metal and an oxide such as ZnO:Al or SnO2:Sb, a conductive polymer such as poly(3-methylthiophene), poly[3,4-(ethylene-1,2-dioxy) thiophene] (PEDT), polypyrrole, polyaniline, Carbon Nano Tube (CNT), graphene, and silver nano wire.

19. The display device according to claim 1, wherein a material of the second layer of the first electrode is at least one selected from the conductive metal group consisting of aluminum, tungsten, copper, molybdenum, chromium, titanium, molytungsten, molytitanium, and copper/molytitanium.

* * * * *